US008838993B2

(12) United States Patent
Giobbi et al.

(10) Patent No.: US 8,838,993 B2
(45) Date of Patent: *Sep. 16, 2014

(54) PERSONAL DIGITAL KEY INITIALIZATION AND REGISTRATION FOR SECURE TRANSACTIONS

(71) Applicant: Proxense, LLC, Bend, OR (US)

(72) Inventors: John J. Giobbi, Bend, OR (US); David L. Brown, Jupiter, FL (US); Fred S. Hirt, Brookfield, IL (US)

(73) Assignee: Proxense, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,553

(22) Filed: Mar. 8, 2013

(65) Prior Publication Data

US 2013/0219186 A1 Aug. 22, 2013

Related U.S. Application Data

(63) Continuation of application No. 11/744,832, filed on May 5, 2007, now Pat. No. 8,412,949.

(60) Provisional application No. 60/798,172, filed on May 5, 2006, provisional application No. 60/798,843, filed on May 8, 2006, provisional application No. 60/838,788, filed on Aug. 17, 2006, provisional application No. 60/824,758, filed on Sep. 6, 2006, provisional application No. 60/894,608, filed on Mar. 13, 2007.

(51) Int. Cl.
*G06F 21/00* (2013.01)
*G06F 21/31* (2013.01)
*G06F 21/32* (2013.01)
*G06F 21/34* (2013.01)

(52) U.S. Cl.
CPC ............... *G06F 21/31* (2013.01); *G06F 21/32* (2013.01); *G06F 21/34* (2013.01)
USPC .......................................... 713/186; 713/169

(58) Field of Classification Search
CPC ......... G06F 21/34; G06F 21/32; G06F 21/31; H04L 63/0861
USPC .................................................. 713/186, 169
See application file for complete search history.

(56) References Cited

U.S. PATENT DOCUMENTS

| 4,759,060 A | 7/1988 | Hayashi et al. |
| 4,993,068 A | 2/1991 | Piosenka et al. |

(Continued)

FOREIGN PATENT DOCUMENTS

| WO | WO 00/62505 | 10/2000 |
| WO | WO 01/22724 | 3/2001 |

(Continued)

OTHER PUBLICATIONS

Farouk, "Authentication Mechanisms in Grid Computing Environment: Comparative Study", 2012, IEEE, p. 1-6.*

(Continued)

*Primary Examiner* — Taghi Arani
*Assistant Examiner* — Gregory Lane
(74) *Attorney, Agent, or Firm* — Patent Law Works LLP

(57) ABSTRACT

A system and method provide efficient, secure, and highly reliable authentication for transaction processing and/or access control applications. A personal digital key (PDK) is programmed using a trusted programming device to initialize and/or register the PDK for use. In one embodiment, the initialization and registration processes are administered by a specialized trusted Notary to ensure the processes follow defined security procedures. In a biometric initialization, the programming device acquires a biometric input from a user and writes the biometric data to a tamperproof memory in the PDK. In registration, the Programmer communicates to one or more remote registries to create or update entries associated with the user PDK. Once initialized and registered, the PDK can be used for various levels of secure authentication processes.

20 Claims, 15 Drawing Sheets

(56) References Cited

U.S. PATENT DOCUMENTS

| | | |
|---|---|---|
| 5,187,352 A | 2/1993 | Blair et al. |
| 5,296,641 A | 3/1994 | Stelzl |
| 5,392,433 A | 2/1995 | Hammersley et al. |
| 5,416,780 A | 5/1995 | Patel |
| 5,422,632 A | 6/1995 | Bucholtz et al. |
| 5,450,489 A | 9/1995 | Ostrover et al. |
| 5,619,251 A | 4/1997 | Kuroiwa et al. |
| 5,629,980 A | 5/1997 | Stefik et al. |
| 5,644,354 A | 7/1997 | Thompson et al. |
| 5,666,412 A | 9/1997 | Handelman et al. |
| 5,784,464 A | 7/1998 | Akiyama et al. |
| 5,825,876 A | 10/1998 | Peterson, Jr. |
| 5,857,020 A | 1/1999 | Peterson, Jr. |
| 5,892,825 A | 4/1999 | Mages et al. |
| 5,894,551 A | 4/1999 | Huggins et al. |
| 5,898,880 A | 4/1999 | Ryu |
| 5,917,913 A | 6/1999 | Wang |
| 5,928,327 A | 7/1999 | Wang et al. |
| 5,991,399 A | 11/1999 | Graunke et al. |
| 5,991,749 A | 11/1999 | Morril, Jr. |
| 6,016,476 A | 1/2000 | Maes et al. |
| 6,018,739 A | 1/2000 | McCoy et al. |
| 6,035,038 A | 3/2000 | Campinos et al. |
| 6,035,329 A | 3/2000 | Mages et al. |
| 6,038,334 A | 3/2000 | Hamid |
| 6,041,410 A | 3/2000 | Hsu et al. |
| 6,042,006 A | 3/2000 | Van Tilburg et al. |
| 6,055,314 A | 4/2000 | Spies et al. |
| 6,070,796 A | 6/2000 | Sirbu |
| 6,088,730 A | 7/2000 | Kato et al. |
| 6,104,334 A | 8/2000 | Allport |
| 6,121,544 A | 9/2000 | Petsinger |
| 6,148,142 A | 11/2000 | Anderson |
| 6,161,179 A | 12/2000 | Seidel |
| 6,185,316 B1 | 2/2001 | Buffam |
| 6,209,089 B1 | 3/2001 | Selitrennikoff et al. |
| 6,219,109 B1 | 4/2001 | Raynesford et al. |
| 6,219,439 B1 | 4/2001 | Burger |
| 6,247,130 B1 | 6/2001 | Fritsch |
| 6,256,737 B1 | 7/2001 | Bianco et al. |
| 6,266,415 B1 | 7/2001 | Campinos et al. |
| 6,295,057 B1 | 9/2001 | Rosin et al. |
| 6,336,121 B1 | 1/2002 | Lyson et al. |
| 6,336,142 B1 | 1/2002 | Kato et al. |
| 6,363,485 B1 | 3/2002 | Adams et al. |
| 6,367,019 B1 | 4/2002 | Ansell et al. |
| 6,381,747 B1 | 4/2002 | Wonfor et al. |
| 6,385,596 B1 | 5/2002 | Wiser et al. |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |
| 6,424,715 B1 | 7/2002 | Saito |
| 6,425,084 B1 | 7/2002 | Rallis et al. |
| 6,434,535 B1 | 8/2002 | Kupka et al. |
| 6,446,130 B1 | 9/2002 | Grapes |
| 6,463,534 B1 | 10/2002 | Geiger et al. |
| 6,480,188 B1 | 11/2002 | Horsley |
| 6,490,443 B1 | 12/2002 | Freeny, Jr. |
| 6,510,350 B1 | 1/2003 | Steen, III et al. |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,805 B1 | 5/2003 | Ma et al. |
| 6,564,380 B1 | 5/2003 | Murphy |
| 6,628,302 B2 | 9/2003 | White et al. |
| 6,632,992 B2 | 10/2003 | Hasegawa |
| 6,647,417 B1 | 11/2003 | Hunter et al. |
| 6,667,684 B1 | 12/2003 | Waggamon et al. |
| 6,683,954 B1 | 1/2004 | Searle |
| 6,697,944 B1 | 2/2004 | Jones et al. |
| 6,709,333 B1 | 3/2004 | Bradford et al. |
| 6,711,464 B1 | 3/2004 | Yap et al. |
| 6,775,655 B1 | 8/2004 | Peinado et al. |
| 6,804,825 B1 | 10/2004 | White et al. |
| 6,806,887 B2 | 10/2004 | Chernock et al. |
| 6,850,147 B2 | 2/2005 | Prokoski et al. |
| 6,873,975 B1 | 3/2005 | Hatakeyama et al. |
| 6,950,941 B1 | 9/2005 | Lee et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,983,882 B2 | 1/2006 | Cassone |
| 7,012,503 B2 | 3/2006 | Nielsen |
| 7,090,126 B2 | 8/2006 | Kelly et al. |
| 7,112,138 B2 | 9/2006 | Hedrick et al. |
| 7,137,012 B1 | 11/2006 | Kamibayshi et al. |
| 7,191,466 B1 | 3/2007 | Hamid et al. |
| 7,218,944 B2 | 5/2007 | Cromer et al. |
| 7,249,177 B1 | 7/2007 | Miller |
| 7,305,560 B2 | 12/2007 | Giobbi |
| 7,529,944 B2 | 5/2009 | Hamid |
| 7,574,734 B2 | 8/2009 | Fedronic et al. |
| 7,587,611 B2 | 9/2009 | Johnson et al. |
| 7,617,523 B2 | 11/2009 | Das et al. |
| 7,644,443 B2 | 1/2010 | Matsuyama et al. |
| 7,715,593 B1 | 5/2010 | Adams et al. |
| 7,883,417 B2 | 2/2011 | Bruzzese et al. |
| 7,904,718 B2 | 3/2011 | Giobbi et al. |
| 2001/0044337 A1 | 11/2001 | Rowe et al. |
| 2002/0007456 A1 | 1/2002 | Peinado et al. |
| 2002/0013772 A1 | 1/2002 | Peinado |
| 2002/0014954 A1 | 2/2002 | Fitzgibbon et al. |
| 2002/0015494 A1 | 2/2002 | Nagai et al. |
| 2002/0023032 A1 | 2/2002 | Pearson et al. |
| 2002/0026424 A1 | 2/2002 | Akashi |
| 2002/0071559 A1 | 6/2002 | Christensen et al. |
| 2002/0073042 A1 | 6/2002 | Maritzen et al. |
| 2002/0098888 A1 | 7/2002 | Rowe et al. |
| 2002/0103027 A1 | 8/2002 | Rowe et al. |
| 2002/0104006 A1* | 8/2002 | Boate et al. .................... 713/186 |
| 2002/0108049 A1 | 8/2002 | Xu et al. |
| 2002/0109580 A1 | 8/2002 | Shreve et al. |
| 2002/0129262 A1 | 9/2002 | Kutaragi et al. |
| 2002/0138767 A1 | 9/2002 | Hamid et al. |
| 2002/0140542 A1 | 10/2002 | Prokoski et al. |
| 2002/0144117 A1* | 10/2002 | Faigle ............................ 713/169 |
| 2002/0150282 A1 | 10/2002 | Kinsella |
| 2002/0152391 A1 | 10/2002 | Willins et al. |
| 2002/0158750 A1 | 10/2002 | Almalik |
| 2002/0174348 A1 | 11/2002 | Ting |
| 2002/0178063 A1 | 11/2002 | Gravelle et al. |
| 2002/0191816 A1 | 12/2002 | Maritzen et al. |
| 2003/0036425 A1 | 2/2003 | Kaminkow et al. |
| 2003/0046552 A1 | 3/2003 | Hamid |
| 2003/0054868 A1 | 3/2003 | Paulsen et al. |
| 2003/0054881 A1 | 3/2003 | Hedrick et al. |
| 2003/0055689 A1 | 3/2003 | Block et al. |
| 2003/0079133 A1 | 4/2003 | Breiter et al. |
| 2003/0115474 A1 | 6/2003 | Khan et al. |
| 2003/0127511 A1 | 7/2003 | Kelly et al. |
| 2003/0139190 A1 | 7/2003 | Steelberg et al. |
| 2003/0149744 A1 | 8/2003 | Bierre et al. |
| 2003/0172037 A1 | 9/2003 | Jung et al. |
| 2003/0176218 A1 | 9/2003 | LeMay et al. |
| 2003/0186739 A1 | 10/2003 | Paulsen et al. |
| 2004/0098597 A1* | 5/2004 | Giobbi ............................ 713/185 |
| 2004/0127277 A1 | 7/2004 | Walker et al. |
| 2004/0128162 A1 | 7/2004 | Schlotterbeck et al. |
| 2004/0129787 A1 | 7/2004 | Saito et al. |
| 2004/0209690 A1 | 10/2004 | Bruzzese et al. |
| 2004/0209692 A1 | 10/2004 | Schober et al. |
| 2004/0215615 A1 | 10/2004 | Larsson et al. |
| 2004/0230488 A1 | 11/2004 | Beenau et al. |
| 2005/0074126 A1 | 4/2005 | Stanko |
| 2005/0081040 A1 | 4/2005 | Johnson et al. |
| 2005/0109836 A1 | 5/2005 | Ben-Aissa |
| 2005/0229007 A1* | 10/2005 | Bolle et al. .................... 713/186 |
| 2005/0251688 A1 | 11/2005 | Nanavati et al. |
| 2005/0253683 A1 | 11/2005 | Lowe |
| 2006/0022046 A1 | 2/2006 | Iwamura |
| 2006/0113381 A1 | 6/2006 | Hochstein et al. |
| 2006/0156027 A1 | 7/2006 | Blake |

(56) References Cited

U.S. PATENT DOCUMENTS

| | | | |
|---|---|---|---|
| 2007/0220272 | A1 | 9/2007 | Campisi et al. |
| 2008/0019578 | A1 | 1/2008 | Saito et al. |
| 2008/0188308 | A1 | 8/2008 | Shepherd et al. |
| 2009/0328182 | A1 | 12/2009 | Malakapalli et al. |
| 2010/0117794 | A1 | 5/2010 | Adams et al. |
| 2011/0126188 | A1 | 5/2011 | Bernstein et al. |

FOREIGN PATENT DOCUMENTS

| | | |
|---|---|---|
| WO | WO 01/75876 | 10/2001 |
| WO | WO 01/77790 | 10/2001 |
| WO | WO 2005/050450 | 6/2005 |
| WO | WO 2005/086802 | 9/2005 |

OTHER PUBLICATIONS

"Alliance Activities: Publications: Identity—Smart Card Alliance," Smart Card Alliance, 1997-2007, Retrieved on Jan. 7, 2007 from <URL:http://www.smartcardalliance.org/pages/publications-identity>, 3 pgs.
"Applying Biometrics to Door Access," Security Magazine, Sep. 26, 2002, Retrieved on Jan. 7, 2007, from <URL:http://www.securitymagazine.com/CDA/Articles/technologies/3ae610eaa34d8010VgnVCM100000f932a8c0_>, 5 pgs.
Van Winkle, William, "Bluetooth, the King of Connectivity," Laptop Buyer's Guide and Handbook, Jan. 2000, pp. 148-153.
Yoshida, Junko, "Content Protection Plan Targets Wireless Home Networks," www.eetimes.com, Jan. 11, 2002, 2 pgs.
Debow, Yvette, "Credit/Debit Debuts in Midwest Smart Card Test," Computers in Banking, v6, n11, Nov. 1989, 4 pgs.
Dennis, Sylvia, "Digital Passports Need Not Infringe Civil Liberties," Newsbytes, Dec. 2, 1999, 2 pgs.
Blum, Jonathan, "Digital Rights Management May Solver the Napster "Problem"," Technology Investor Industrysector, Oct. 2000, pp. 24-27.
Lake, Matt, "Downloading for Dollars," Sound & Vision, Nov. 2000, pp. 137-138.
Sapsford, Jathon, "E-Business: Sound Waves Could Help Ease Web-Fraud Woes," Wall Street Journal, Aug. 14, 2000, 2 pgs.
"Firecrest Shows How Truly Commercially-Minded Companies Will Exploit the Internet," Computergram International, Jan. 18, 1996, 2 pgs.
"Frequently Asked Questions (FAQs) About BioPay," BioPay, LLC, 2007, Retrieved on Jan. 7, 2007, from <URL: http://www.biopay.com/faqs-lowes.asp>, 5 pgs.
McIver, R. et al., "Identification and Verification Working Together," Bioscrypt, Aug. 27, 2004, Retrieved on Jan. 7, 2007, from <URL:http://www.ibia.org/membersadmin/whitepapers/pdf/15/Identification%20and%20Verification%20Working%20Together.pdf>, 5 pgs.
Weber, Thomas E., "In the Age of Napster, Protecting Copyright is a Digital Arms Race," Wall Street Journal, Jul. 24, 2000, 3 pgs.
PCT International Search Report, PCT/US04/38124, Apr. 7, 2005, 10 pgs.
PCT International Search Report, PCT/US05/43447, Feb. 22, 2007, 7 pgs.
PCT International Search Report, PCT/US05/46843, Mar. 1, 2007, 10 pgs.
PCT International Search Report, PCT/US07/11102, Oct. 3, 2008, 11 pgs.
PCT International Search Report, PCT/US07/11103, Apr. 23, 2008, 9 pgs.
PCT International Search Report, PCT/US07/11104, Jun. 26, 2008, 9 pgs.
PCT International Search Report, PCT/US07/11105, Oct. 20, 2008, 10 pgs.
Nilsson, J. et al., "Match-On-Card for Java Cards," Precise Biometrics, White Paper, Apr. 2004, Retrieved on Jan. 7, 2007, from <URL:http://www.ibia.org/membersadmin/whitepapers/pdf/17/Precise%20Match-on-Card%20for%20Java%20Cards.pdf>, 5 pgs.
Nordin, B., "Match-On-Card Technology," Precise Biometrics, White Paper, Apr. 2004, Retrieved on Jan. 7, 2007 from <URL:http://www.ibia.org/membersadmin/whitepapers/pdf/17/Precise%20Match-on-Card%20technology.pdf>, 7 pgs.
"Micronas and Thomson Multimedia Showcase a New Copy Protection System that Will Drive the Future of Digital Television," www.micronas.com, Jan. 8, 2002, 3 pgs.
Pope, "Oasis Digital Signature Services: Digital Signing without the Headaches," Internet Computing-IEEE, vol. 10, Oct. 2006, pp. 81-84.
"SAFModuleTM: A Look Into Strong Authentication," saflink Corporation, Retrieved on Jan. 7, 2007, from <URL: http://www.ibia.org/membersadmin/whitepapers/pdf/6/SAFmod_WP.pdf>, 8 pgs.
"Say Hello to Bluetooth," Bluetooth Web site, Jun. 2000, 4 pgs.
"Smart Cards and Biometrics White Paper," Smart Card Alliance, May 2002, Retrieved on Jan. 7, 2007, from <URL:http://www.securitymanagement.com/library/smartcard_faqtech0802.pdf>, 7 pgs.
Lewis, Peter H., "Sony and Visa in On-Line Entertainment Venture," New York Times, v145, Nov. 16, 1995, 1 pg.
Fasca, Chad, "The Circuit," Electronic News, vol. 45 Iss. 45, Nov. 8, 1999, 2 pgs.
Wallace, Bob, "The Internet Unplugged," InformationWeek.com, Dec. 13, 1999, pp. 22-24.
Paget, Paul, "The Security Behind Secure Extranets," Enterprise Systems Journal, Dec. 1999, 4 pgs.
Kontzer, Tony, "Thomson Bets on Smart Cards for Video Encryption," www.informationweek.com, Jun. 7, 2001, 1 pg.
Press Release, "Thomson Multimedia Unveils Copy Protection Proposal Designed to Provide Additional Layer of Digital Content Security," www.thompson-multimedia.com, May 30, 2001, 2 pgs.
Wade, Will, "Using Fingerprints to Make Payments at POS Slowly Gaining Popularity," Credit Union Journal, International Biometric Group, Apr. 21, 2003, Retrieved on Jan. 7, 2007, from <URL:http://www.biometricgroup.com/in_the_news/04.21.03.html>, 3 pgs.
Antonoff, Michael, "Visiting Video Valley," Sound & Vision, Nov. 2001, pp. 116, 118-119.
"What is a File?," Apr. 30, 1998, URL: http://unixhelp.ed.ac.uk/editors/whatisafile.html, accessed Mar. 11, 2010 via http://waybackmachine.org/1998061500000* /http://unixhelp.ed.ac.uk/editors/whatisafile.html, 1 pg.

\* cited by examiner

PERSONAL DIGITAL KEY INITIALIZATION AND REGISTRATION FOR SECURE TRANSACTIONS

CROSS-REFERENCE TO RELATED APPLICATIONS

The present application claims priority, under 35 U.S.C. §120, to U.S. application Ser. No. 11/744,832, entitled "Personal Digital Key Initialization and Registration for Secure Transactions" filed, May 5, 2007, which claims the benefit of U.S. Provisional Application No. 60/798,172 entitled "Touch Pay" filed on May 5, 2006; U.S. Provisional Application No. 60/798,843 entitled "Touch Pay" filed on May 8, 2006; U.S. Provisional Application No. 60/838,788 entitled "Personal Digital Key Accessible Storage Device and Processor" filed on Aug. 17, 2006; U.S. Provisional Application No. 60/824,758 entitled "Truprox Touch Technology" filed on Sep. 6, 2006; and U.S. Provisional Application No. 60/894,608 entitled "TruProx Stored-Photo Extension" filed on Mar. 13, 2007, the entire contents of which are all herein incorporated by reference.

BACKGROUND

1. Field of Art

The invention generally relates to electronic authentication, and more specifically, to secure authentication using biometric verification. In particular, the present invention relates to the initialization and registration of personal digital keys.

2. Description of the Related Art

Optimizing sales transactions and providing secure access to physical and/or digital assets are challenges faced by many businesses and organizations. Ensuring these processes are safe, efficient and simple is important to merchants, providers, users and consumers alike. Conventionally, technologies such as magnetic cards (e.g., credit cards, debit cards, ATM cards, and employee badges) have been used in attempt to address these needs. More recently, various contactless cards or tokens requiring placement near compatible readers have been used.

Each of these technologies, however, has inherent problems in providing secure transaction processing and access control. In particular, the conventional technologies fail to sufficiently ensure that individuals attempting to perform a transaction are associated with the access device and are authorized to do so. Conventional attempts to address this issue include requiring users to provide Personal Identification Numbers (PINs) or passwords in conjunction with account numbers. While in some instances, these options have helped to combat fraudulent activity, these solutions add unwanted complexity and delay to transactions. With the growing need to memorize various PINs and passwords, individuals tend to repeatedly use the same, simple phrase to protect many items, or worse, keep the written phrases in their purse/wallet or next to their computer. Thus, the use of PINs and passwords are often defeated.

A technology better suited to address the issue of authenticating users is biometrics. In biometric authentication, physical and/or behavioral characteristics of an individual are analyzed to uniquely identify the individual. For example, biometric characteristics can include fingerprint, retinal, iris, face, palm, DNA, voice or signature characteristics that can each be uniquely associated with the individual. However, traditional biometric authentication solutions also suffer from significant problems. First, traditional biometric authentication techniques typically expose the participating parties to serious liabilities, risks and inefficiencies. Conventional biometric authentication techniques nearly always require users to release personal, private and unchangeable data to a controlling-entity (e.g., a merchant or business authority) or to a third-party relied upon by the controlling-entity. This exposes an individual's personal biometric information to the possibility of theft and fraudulent use. Further, controlling entities must either assume the risks and liabilities of storing this data, or trust the data to a third-party's care.

Second, conventional biometric authentication techniques generally require an individual to submit biometric information (e.g., a fingerprint, retinal scan, facial scan, or signature) for storage in a database that can then be later used for comparison with biometric data acquired at the point of transaction. This "enrollment" process is time-consuming, risky, error-prone and considered intrusive by many individuals. Further, the enrollment process must be repeated for each individual for every intended use. For example, a user may need to enroll for biometric authentication with his/her company (e.g., for secure access to facilities or digital files), and separately enroll with various merchants using biometric authentication for transactions. Thus, the individual has to spend significant time completing each separate enrollment, and additionally must trust each entity with his/her personal biometric information. For these reasons alone many individuals do not even consider these options.

The above-defined issues represent serious roadblocks to the widespread deployment and acceptance of conventional biometric authentication options. Unless the identified deficiencies are addressed, the full potential of biometric solutions will never be realized. Therefore, a new technology is needed that provides highly reliable, safe and efficient secure authentication for transaction-processing and/or access control. Moreover, the new technology should allow for a simple and efficient enrollment process that does not put an individual's highly personal information at risk of identity theft or other fraudulent use.

SUMMARY

A system and method provide efficient, secure and highly reliable authentication for transaction processing and/or access control applications. A portable physical device, referred to herein as a Personal Digital Key or "PDK", stores one or more profiles (e.g., a biometric profile) in a tamper-proof memory. The biometric profile is acquired in a secure trusted process and is uniquely associated with an individual that is authorized to use and is associated with the PDK. The PDK can wirelessly transmit the identification information including a unique PDK identification number and the biometric profile over a secure wireless channel for use in an authentication process. Additionally, the PDK can store other information such as credit/debit card information, bank information, or personal information in a memory for use in authorizing or completing a transaction.

Typically, a receiving device, referred to herein as a Reader, wirelessly receives the profile from the PDK in order to process a transaction or provide access to secure digital or physical assets. In one embodiment, the Reader acquires a biometric input from the individual carrying the PDK at the point of transaction. The biometric input can be acquired by, for example, a fingerprint scan, iris scan, retinal scan, palm scan, face scan, DNA analysis, signature analysis, voice analysis or any other input mechanism that provides physical or behavioral characteristics uniquely associated with the individual. The Reader compares the biometric profile received from the PDK to the biometric input obtained at the point of transaction to determine if a transaction should be authorized.

In one embodiment, the Reader is further adapted to communicate with one or more remote registries to provide an additional layer of security in the authentication process. Information transmitted from the PDK can be compared to entries stored in the registries to ensure the PDK (and its owner) have not participated in any fraudulent use and that the PDK is not invalid, lost or stolen. In yet another embodiment, one or more biometric authentications, remote registry authentications or other types of authentication are used in combination.

The PDK is programmed by a programming device referred to herein as a "Programmer" during initialization and registration processes. In one embodiment, the programming process is witnessed and authenticated by a specialized trusted Notary. In one embodiment of the initialization process, the Programmer is communicatively coupled with a PDK from the user and a PDK from the Notary. Information is read from the user PDK to determine if the PDK is authorized for initialization and Notary information is read from the Notary PDK to determine if the Notary is authorized to perform the initialization. If both the user and the Notary are authorized, the Programmer prompts the user to provide a biometric input. The Notary witnesses the biometric acquisition process either in person or remotely to ensure the information can be trusted. The Programmer then writes biometric profile data to a memory in the user PDK. In one embodiment, the Programmer does not store the personal biometric data.

In registration, the Programmer communicates to the Central Registry and/or one or more private entries to create or update entries associated with the user PDK. Registration allows the PDK owner to be authenticated for transactions requiring registry authentication. A registry entry may include, for example, a unique PDK ID, purchasing information associated with the user and personal information associated with the user.

The initialization and registration processes further enhance security by storing initialization/registration history data to both the user PDK and the Programmer memory. This data includes, for example, the user PDK ID, the Notary PDK ID, the programmer ID, a site ID, or other information associated with programming including software revisions, checksums and other metrics intended to verify the current software versions used in both the Programmer and the PDK. The history can be recalled in the future for auditing purposes.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
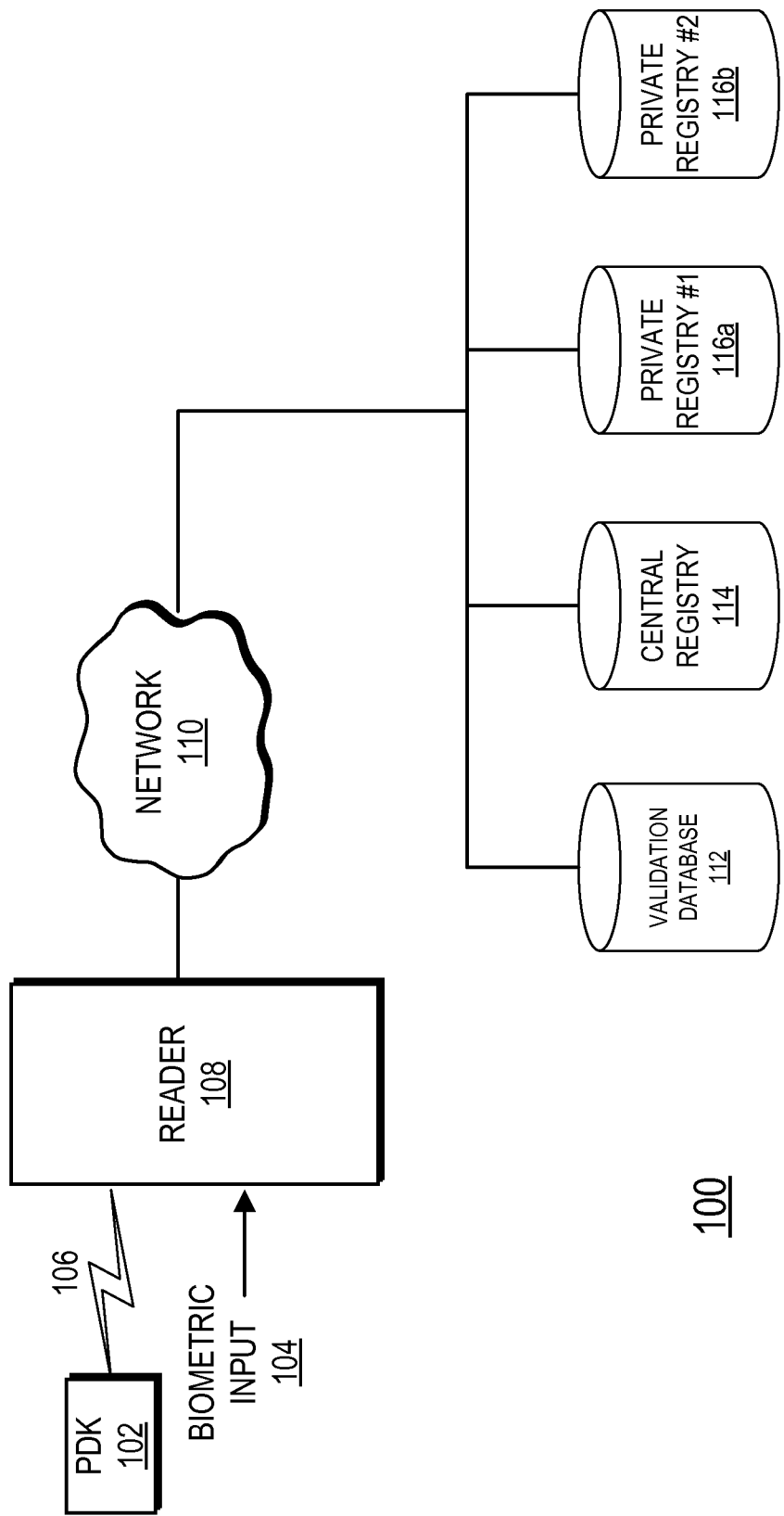
FIG. 1 is a high level block diagram illustrating a system for secure electronic authentication.

FIG. 1 is a high level block diagram illustrating a system for securely authenticating an individual for transaction-processing and/or access control applications. The system 100 comprises a Personal Digital Key (PDK) 102, a Reader 108, a network 110 and one or more external databases including a validation database 112, a Central Registry 114 and one or more private registries 116. The Reader 108 is coupled to the PDK 102 by a wireless link 106 and coupled to a network 110 by either a wired or wireless link. The Reader 108 is also adapted to receive a biometric input 104 from a user and is capable of displaying status to a user. The network 110 couples the validation database 112, the Central Registry 114 and two private registries 116 to the Reader 108. In alternative embodiments, different or additional external registries or databases may be coupled to the network 110. In another embodiment, the Reader 108 operates as a standalone device without a connection to the network 110.

The system 100 addresses applications where it is important to ensure a specific individual is authorized to perform a given transaction. A transaction as used herein can include executing a purchase or financial dealing, enabling access to physical and/or digital items, verifying identification or personal information or executing other tasks where it is important to authenticate an individual for use. Generally, the Reader 108 wirelessly receives information stored in the PDK 102 that uniquely identifies the PDK 102 and the individual carrying the PDK 102. The Reader 108 can also receive a biometric input 104 from the individual. Based on the received information, the Reader 108 determines if the transaction should be authorized. Beneficially, the system 100 provides comprehensive authentication without the need for PINs or passwords. Moreover, personal biometric information need not be stored in any local or remote storage database and is only stored on the user's own PDK. Furthermore, in one embodiment, purchase transactions can be efficiently completed without requiring the use of physical credit cards, tokens or other user action beyond initiating the transaction.

The credibility of the system 100 is ensured by the use of a PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

To establish the trust, credibility and confidence of the authentication system, information stored in the PDK 102 is acquired by a process that is trusted, audited and easily verified. The process is ensured by a trusted third-party system, referred to herein as a Notary, that administers the acquisition and storage of information in the PDK 102 according to defined security protocols. In one embodiment, the Notary is a system and/or a trusted individual that witnesses the acquisition and storage either in person or remotely. In another embodiment, the Notary comprises trusted hardware that administers the initialization process by an automated system. Thus, once initialized by the trusted process, the PDK 102 can prove that the information it stores is that of the individual. Example embodiments of the initialization process are described in more detail below with reference to FIGS. 8-14.

The Reader 108 wirelessly communicates with the PDK 102 when the PDK 102 is within a proximity zone of the Reader 108. The proximity zone can be, for example, several meters in radius and can be adjusted dynamically by the Reader 108. Thus, in contrast to many conventional RF ID devices, the Reader 108 can detect and communicate with the PDK 102 without requiring the owner to remove the PDK 102 from his/her pocket, wallet, purse, etc. Generally, the Reader 108 receives uniquely identifying information from the PDK 102 and initiates an authentication process for the individual carrying the PDK 102. In one embodiment, the Reader 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The Reader 108 compares the biometric input 104 to information received from the PDK 102 to determine if a transaction should be authorized. Alternatively, the biometric input 104 can be obtained by a biometric reader on the PDK 102 and transmitted to the Reader 108 for authentication. In additional alternative embodiment, some or all of the authentication process can be performed by the PDK 102 instead of the Reader 108.

The Reader 108 is further communicatively coupled to the network 110 in order to receive and/or transmit information to remote databases for remote authentication. In an alternative embodiment, the Reader 108 includes a non-volatile data storage that can be synchronized with one or more remote databases 112 or registries 114-116. Such an embodiment alleviates the need for a continuous connection to the network 110 and allows the Reader 108 to operate in a standalone mode and for the local data storage to be updated when a connection is available. For example, a standalone Reader 108 can periodically download updated registry entries and perform authentication locally without any remote lookup.

The network 110 provides communication between the Reader 108 and the validation database 112, Central Registry 114 and one or more private registries 116. In alternative embodiments, one or more of these connections may not be present or different or additional network connections may be present. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The validation database 112 stores additional information that may be used for authorizing a transaction to be processed at the Reader 108. For example, in purchase transactions, the validation database 112 is a credit card validation database that is separate from the merchant providing the sale. Alternatively, a different database may be used to validate different types of purchasing means such as a debit card, ATM card, or bank account number.

The registries 114-116 are securely-accessible databases coupled to the network 110 that store, among other items, PDK, Notary, and Reader information. In one embodiment, the registries 114-116 do not store biometric information. In an alternative embodiment, a registry stores biometric information in an encoded format that can only be recovered using an algorithm or encoding key stored in the PDK 102. Information stored in the registries can be accessed by the Reader 108 via the network 110 for use in the authentication process. There are two basic types of registries illustrated: private registries 116 and the Central Registry 114. Private registries 116 are generally established and administered by their controlling entities (e.g., a merchant, business authority, or other entity administering authentication). Private registries 116 can be custom configured to meet the specialized and independent needs of each controlling entity. The Central Registry 114 is a single highly-secured, centrally-located database administered by a trusted third-party organization. In one embodiment, all PDKs 102 are registered with the Central Registry 114 and may be optionally registered with one or more selected private registries 116. In alternative embodiments, a different number or different types of registries may be coupled to the network 110.

Figure 2:
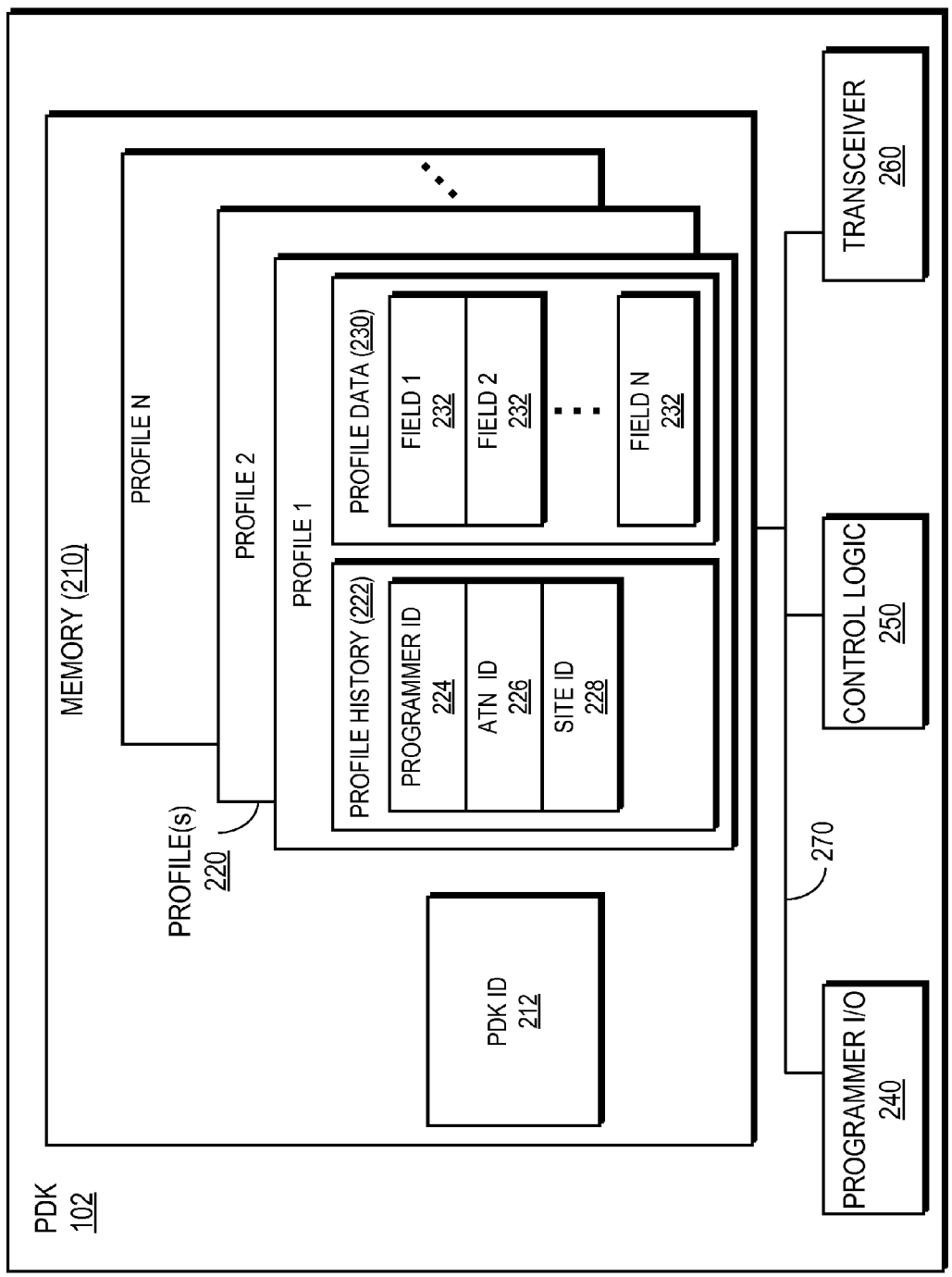
FIG. 2 is a block diagram illustrating one embodiment of a Personal Digital Key (PDK).

Turning now to FIG. 2, an example embodiment of a PDK 102 is illustrated. The PDK 102 comprises a memory 210, a programmer I/O 240, control logic 250, and a transceiver 260, coupled by a bus 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, clothing, or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain, or in a wallet.

The memory 210 can be a read-only memory, a once-programmable memory, a read/write memory or any combination of memory types including physical access secured and tamperproof memories. The memory 210 typically stores a unique PDK ID 212 and one or more profiles 220. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private 116 or Central 114 registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The profile fields 220 can be initially empty at the time of manufacture but can be written to by authorized individuals (e.g., a Notary) and/or hardware (e.g., a Programmer). In one embodiment, each profile 220 comprises a profile history 222 and profile data 230. Many different types of profiles 220 are possible. A biometric profile, for example, includes profile data 230 representing physical and/or behavioral information that can uniquely identify the PDK owner. A PDK 102 can store multiple biometric profiles, each comprising a different type of biometric information. In one embodiment, the biometric profile 220 comprises biometric information transformed by a mathematical operation, algorithm, or hash that represents the complete biometric information (e.g., a complete fingerprint scan). In one embodiment, a mathematical hash is a "one-way" operation such that there is no practical way to re-compute or recover the complete biometric information from the biometric profile. This both reduces the amount of data to be stored and adds an additional layer of protection to the user's personal biometric information. In one embodiment, the biometric profile is further encoded using a encoding key and/or algorithm that is stored with the biometric profile data. Then, for authentication, both the biometric profile data and the encoding key and/or algorithm are passed to the Reader 108.

In one embodiment the PDK 102 also stores one or more biometric profile "samples" associated with each biometric profile. The biometric profile sample is a subset of the complete profile that can be used for quick comparisons of biometric data. In one embodiment, the profile samples can be transmitted over a public communication channel or transmitted with reduced level of encryption while the full biometric profiles are only transmitted over secure channels. In the case of fingerprint authentication, for example, the biometric profile sample may represent only small portion area of the full fingerprint image. In another embodiment, the fingerprint profile sample is data that describes an arc of one or more lines of the fingerprint. In yet another embodiment, the fingerprint profile sample can be data representing color information of the fingerprint.

In another embodiment, the stored profiles 220 include a PIN profile that stores one or more PINS or passwords associated with the PDK owner. Here, the number or password stored in the PIN profile can be compared against an input provided by the user at the point of transaction to authenticate the user. In one embodiment, a PIN profile sample is also stored with the PIN profile that comprises a subset of the full PIN. For example, a PIN profile sample can be only the first two numbers of the PIN that can be used to quickly compare the stored PIN profile to a PIN obtained at the point of transaction.

In yet another embodiment, the PDK 102 stores a picture profile that includes one or more pictures of the PDK owner. In a picture profile authentication, the picture stored in the PDK 102 is transmitted to a display at the point of transaction to allow an administrator (e.g., a clerk or security guard) to confirm or reject the identity of the individual requesting the transaction. In another embodiment, an image is captured of the individual at the point of transaction and compared to the picture profile by an automated image analysis means. Furthermore, picture profiles could be used, for example, in place of conventional passports or drivers licenses to authenticate the identity of an individual and allow for remote identification of individuals. For example, a police officer following a vehicle could obtain an image and identity of the driver while still maintaining a safe distance from the vehicle. In the hospitality industry, a host could greet a guest at the door of a hotel, casino or restaurant and easily recognize the guest by obtaining the guest's picture profile as he/she enters.

A registry or database profile typically stores information associating the user with a registry. The registry profile can be used to determine if the individual is associated with the controlling entity for that registry and if different types of transactions are authorized for the individual. A registry profile can further include additional user information for use with the registry. For example, a private registry profile associated with a particular merchant may include a credit card number that the user has selected as a default for that merchant. In one embodiment, a profile can further include spending limits that limits the amount of purchases a user can make with a particular vendor or using a particular profile.

A profile can further include personal identification information such as name, address, phone number, etc., bank information, credit/debit card information, or membership information. This information can be useful for certain types of transactions. For example, with purchases that require delivery, a PDK 102 can automatically transmit address information to the Reader 108 at the point of transaction. In one embodiment, a profile can store multiple addresses. At the point of transaction, the Reader 108 displays the address options and allows the user to select which address to use.

Generally, some types of profile information (e.g., a biometric profile) can only be acquired during a trusted initialization process that is administered by a trusted Notary. In one embodiment, other secure information such as credit card information are also stored to the PDK in the presence of a Notary. Alternatively, certain types of low-risk information can be added by the user without a Notary, such as, for example a change of address. In another embodiment, once an initial profile has been stored to the PDK 102, a user can add information to the PDK 102 using a Programmer without a Notary through self-authentication. For example, in one embodiment, a PDK 102 that has a stored biometric profile can be "unlocked" by providing a matching biometric input.

Then, once unlocked, the user can add or remove additional profiles, credit cards, personal information, etc. to the PDK 102 using a Programmer. For example, in one embodiment, a user that has unlocked his/her own PDK 102 can store additional biometric information (such as fingerprint information for other fingers) in his/her PDK 102. In another example, a user that cancels a credit card, can unlock his/her PDK 102 to remove the credit card information. In another embodiment, the user can make copies of the PDK 102 or move profiles from one PDK 102 to another once the PDK 102 is unlocked.

The profile history 222 includes a programmer ID field 224, a Notary ID 226, and a site ID field 228. The profile history 222 relates to the specific hardware, Notary, and site used at the time the profile data was created and stored to the PDK. Typically each profile 220 stores its specific profile history 222 along with the profile data 230. The profile history 222 can be recalled for auditing purposes at a later time to ensure the credibility of the stored data. In one embodiment, transaction history can also be stored to the PDK memory 210. Here, the PDK 102 stores information associated with any transactions made with the PDK 102 such as the name of the merchant, the purchase amount, credit card used, etc.

The PDK 102 also includes a programmer I/O 240 that provides an interface to a trusted Programmer (not shown). The Programmer comprises trusted hardware that is used to program the memory 210 of the PDK 102. An example embodiment of a Programmer is described in more detail below with reference to FIG. 9. The programmer I/O 240 can be, for example, a USB interface, serial interface, parallel interface, or any other direct or wireless link for transferring information between the PDK 102 and the Programmer. When coupled to the Programmer, the programmer I/O 240 receives initialization data, registration data or other information to be stored in the memory 210.

The control logic 250 coordinates between functions of the PDK 102. In one embodiment, the control logic 250 facilitates the flow of information between the programmer I/O 240, transceiver 260 and memory 210. The control logic 250 can further process data received from the memories 210, programmer I/O 240 and transceiver 260. Note that the control logic 250 is merely a grouping of control functions in a central architecture, and in other embodiments, the control functions can be distributed between the different modules of the PDK 102. The operation of the control logic will be understood to those skilled in the art based on the description below corresponding to FIGS. 4-7D.

The transceiver 260 is a wireless transmitter and receiver for wirelessly communicating with a Reader 108 or other wireless device. The transceiver 260 can send and receive data as modulated electromagnetic signals. Moreover, the data can be encrypted by the transceiver 260 and transmitted over a secure link. Further, the transceiver 260 can actively send connection requests, or can passively detect connection requests from another wireless source. In one embodiment, the transceiver 260 is used in place of a separate programmer I/O 240 and is used to wirelessly communicate with the Programmer for programming. In one embodiment, the transceiver 260 is adapted to communicate over a range of up to around 5 meters.

Optionally, a PDK 102 can also include a built in biometric reader (not shown) to acquire a biometric input from the user. The biometric input can be used to unlock the PDK 102 for profile updates, or for various types of authentication. For example, in one embodiment, a biometric input is received by the PDK 102 and compared to stored biometric information. Then, if the user is authenticated, the PDK 102 can indicate to the Reader 108 that the user is authenticated and transmit additional information (e.g., a credit card number) needed to complete a transaction.

Figure 3:
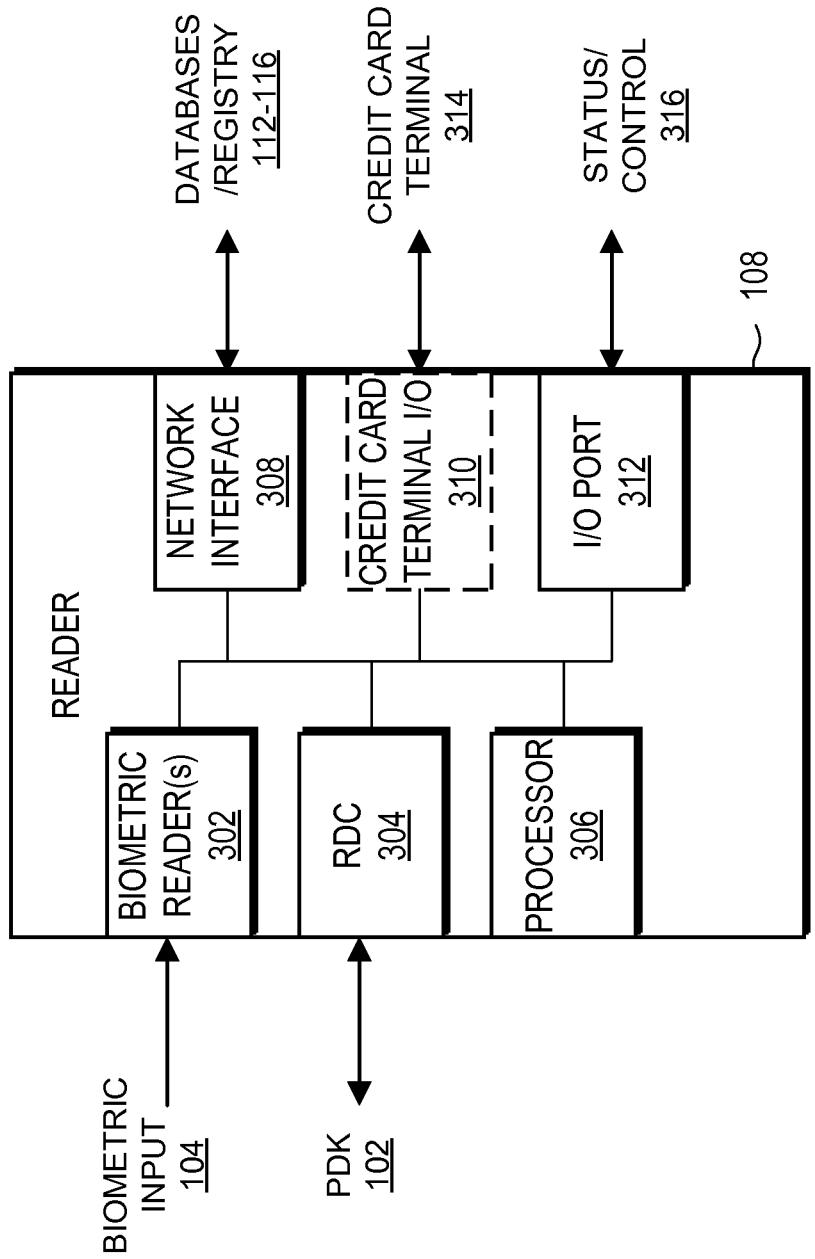
FIG. 3 is a block diagram illustrating one embodiment of a Reader.

Turning now to FIG. 3, an example embodiment of a Reader 108 is illustrated. The embodiment includes one or more biometric readers 302, a receiver-decoder circuit (RDC) 304, a processor 306, a network interface 308, an I/O port 312 and optionally a credit card terminal I/O 310. In alternative embodiments, different or additional modules can be included in the Reader 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method", the entire contents of which are incorporated herein by reference. Encrypting data transmitted between the PDK 102 and Reader 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual at the point of transaction. In one embodiment, the biometric reader 302 is a fingerprint scanner. Here, the biometric reader 302 includes an image capture device adapted to capture the unique pattern of ridges and valleys in a fingerprint also known as minutiae. Other embodiments of biometric readers 302 include retinal scanners, iris scanners, facial scanner, palm scanners, DNA/RNA analyzers, signature analyzers, cameras, microphones, and voice analyzers. Furthermore, the Reader 108 can include multiple biometric readers 302 of different types. In one embodiment, the biometric reader 302 automatically computes mathematical representations or hashes of the scanned data that can be compared to the mathematically processed biometric profile information stored in the PDK 102.

The processor 306 can be any general-purpose processor for implementing a number of processing tasks. Generally, the processor 306 processes data received by the Reader 108 or data to be transmitted by the Reader 108. For example, a biometric input 104 received by the biometric reader 302 can be processed and compared to the biometric profile 220 received from the PDK 102 in order to determine if a transaction should be authorized. In different embodiments, processing tasks can be performed within each individual module or can be distributed between local processors and a central processor. The processor 306 further includes a working memory for use in various processes such as performing the method of FIGS. 4-7D.

The network interface 308 is a wired or wireless communication link between the Reader 108 and one or more external databases such as, for example, a validation database 112, the Central Registry 114 or a private registry 116. For example, in one type of authentication, information is received from the PDK 102 at the RDC 304, processed by the processor 306, and transmitted to an external database 112-116 through the network interface 308. The network interface 308 can also receive data sent through the network 110 for local processing by the Reader 108. In one embodiment, the network interface 308 provides a connection to a remote system administrator to configure the Reader 108 according to various control settings.

The I/O port 312 provides a general input and output interface to the Reader 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

The credit card terminal I/O 310 optionally provides an interface to an existing credit card terminal 314. In embodiments including the credit card terminal I/O 310, the Reader 108 supplements existing hardware and acts in conjunction with a conventional credit card terminal 314. In an alternative embodiment, the functions of an external credit card terminal 314 are instead built into the Reader 108. Here, a Reader 108 can completely replace an existing credit card terminal 314.

In one embodiment, a Reader 108 is adapted to detect and prevent fraudulent use of PDKs that are lost, stolen, revoked, expired or otherwise invalid. For example, the Reader 108 can download lists of invalid PDKs IDs 212 from a remote database and block these PDKs 102 from use with the Reader 108. Furthermore, in one embodiment, the Reader 108 can update the blocked list and/or send updates to remote registries 114-116 or remote Readers 108 upon detecting a fraudulently used PDK 102. For example, if a biometric input 104 is received by the Reader 108 that does not match the biometric profile received from the PDK 102, the Reader 108 can obtain the PDK ID 212 and add it to a list of blocked PDK IDs 212. In another embodiment, upon detecting fraudulent use, the Reader 108 can send a signal to the PDK 102 that instructs the PDK 102 to deactivate itself. The deactivation period can be, for example, a fixed period of time, or until the rightful owner requests re-activation of the PDK 102. In yet another embodiment, the Reader 108 can send a signal instructing the fraudulently obtained PDK 102 to send alarm signals indicating that the PDK 102 a stolen device. Here, a stolen PDK 102 can be tracked, located and recovered by monitoring the alarm signals. In one embodiment, the Reader 108 stores biometric or other identifying information from an individual that attempts to fraudulently use a PDK 102 so that the individual's identity can be determined.

Generally, the Reader 108 is configured to implement at least one type of authentication prior to enabling a transaction. In many cases, multiple layers of authentication are used. A first layer of authentication, referred to herein as "device authentication", begins any time a PDK 102 moves within range of a Reader 108. In device authentication, the Reader 108 and the PDK 102 each ensure that the other is valid based on the device characteristics, independent of any profiles stored in the PDK 102. In some configurations, when fast and simple authentication is desirable, only device authentication is required to initiate the transaction. For example, a Reader 108 may be configured to use only device authentication for low cost purchases under a predefined amount (e.g., $25). The configuration is also useful in other types of low risk transactions where speed is preferred over additional layers of authentication.

Other configurations of the Reader 108 require one or more additional layers of authentication, referred to herein as "profile authentication" based on one or more profiles stored in the PDK 102. Profile authentication can include, for example, a biometric authentication, a PIN authentication, a photo authentication, a registry authentication, etc. or any combination of the above authentication types. Profile authentications are useful when a more exhaustive authentication process is desired, for example, for high purchase transactions or for enabling access to classified assets.

Figure 4:
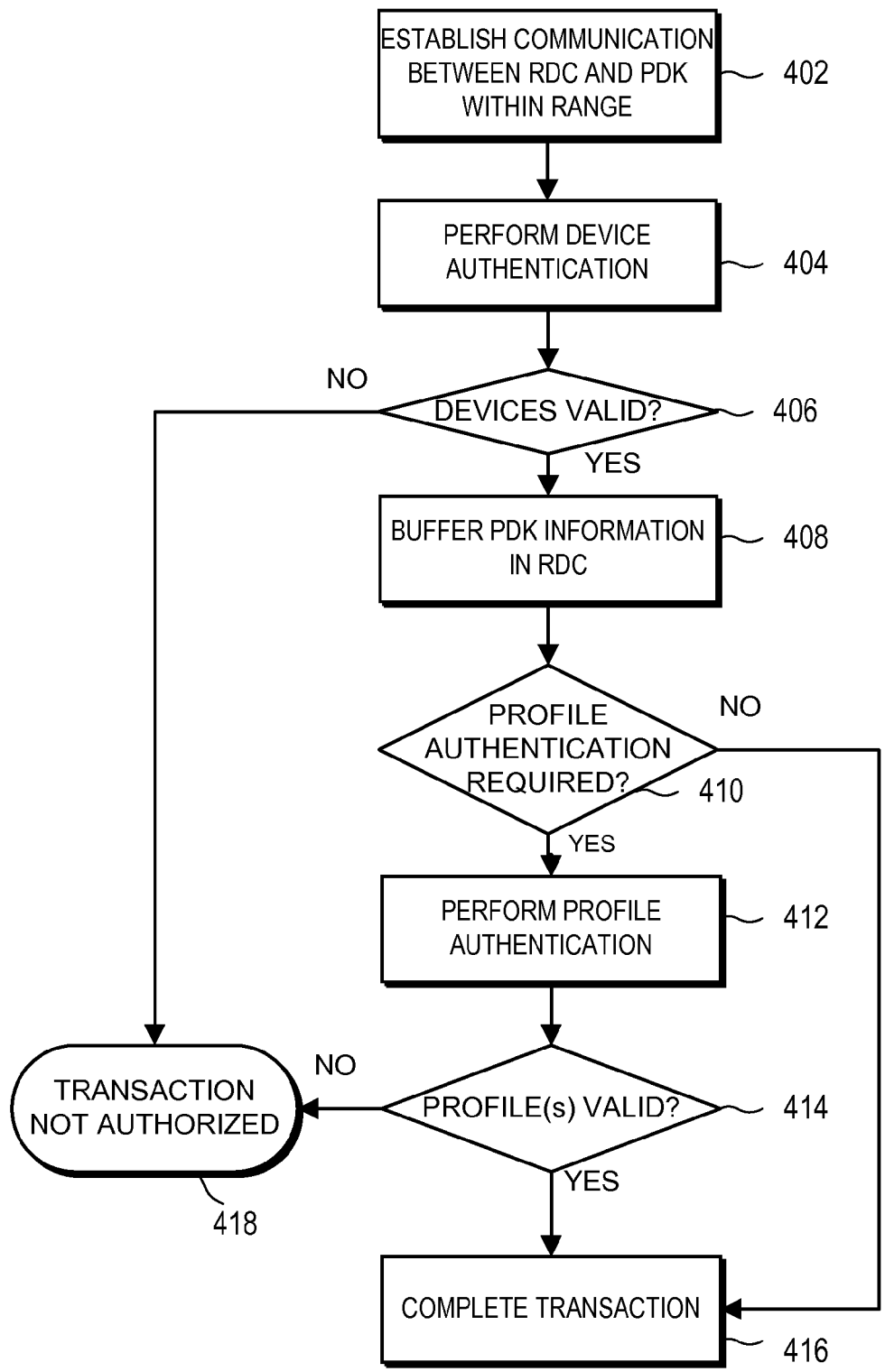
FIG. 4 is a flowchart illustrating one embodiment of a process for authorizing a transaction using secure authentication.

FIG. 4 illustrates an example embodiment of a process for secure authentication of a transaction. When a PDK 102 comes within range of a Reader 108, communication is automatically established 402 between the RDC 304 of the Reader 108 and the PDK 102. In one embodiment, the RDC 304 continually transmits beacons that are detected by the PDK 102 when it enters a proximity zone of the Reader 108. In an alternative embodiment, the communication is instead initiated by the PDK 102 and acknowledged by the Reader 108. Generally, initial communication between the Reader 108 and the PDK 102 is not encrypted in order to provide faster and more power efficient communication.

In step 404, a device authentication is performed. Here, the Reader 108 establishes if the PDK 102 is a valid device and PDK 102 establishes if the Reader 108 is valid. Furthermore, device authentication determines if the PDK is capable of providing the type of authentication required by the Reader 108.

Figure 5:
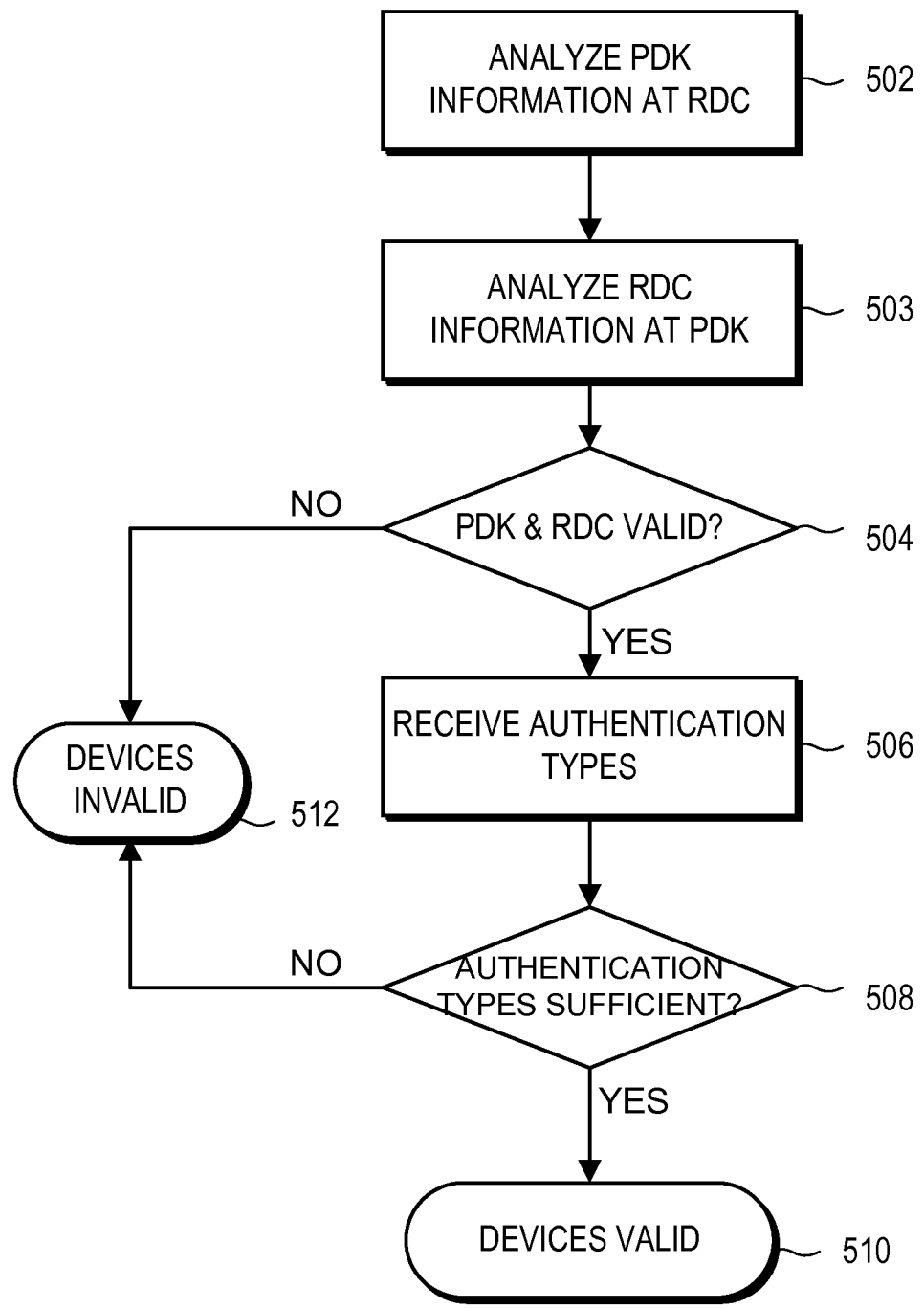
FIG. 5 is a flowchart illustrating one embodiment of a process for device authentication by a Reader.

An example embodiment of a method for performing 404 device authentication is illustrated in FIG. 5. The RDC 304 receives and analyzes 502 information from the PDK 102; and the PDK 102 receives and analyzes 502 information received from the RDC 304. Generally, this initial information is transmitted over a public communication channel in an unencrypted format. Based on the received information, each device 102, 304 determines 504 if the other is valid. As will be apparent to one of ordinary skill in the art, a number of different protocols can be used for this type of authentication such as, for example, a challenge-response authentication or a challenge handshake authentication protocol (CHAP). If either of the devices 102, 304 is invalid 512, the process ends. If both the PDK 102 and the RDC 304 are determined by the other to be valid, the Reader 108 requests and receives 506 authentication type information from the PDK 102 indicating the different types of authentication the PDK 102 is capable of satisfying based on the types of profiles the PDK 102 stores. The available profile types in the PDK 102 are compared against the authentication types that can be used by the Reader 108. For example, a particular Reader 108 may be configured to perform only a fingerprint authentication and therefore any PDK without a fingerprint biometric profile cannot be used with the Reader 108. In one embodiment, the Reader 108 can allow more than one type of profile to be used. In another embodiment, the Reader 108 requires more than one type of profile for authentication, while in yet further embodiments no profile authentications are required. Next, the method determines 508 whether the PDK 102 has one or more profiles sufficient for authentication. If the PDK 102 does not have one or more profiles sufficient for authentication with the Reader 108, the devices 102, 304 are determined to be invalid 512 because they cannot be used with each other. If the PDK 102 does have one or more sufficient types of profiles, the devices are valid 510.

Turning back to FIG. 4, if either the PDK 102 or RDC 304 is not found valid during device authentication 404, the transaction is not authorized 418 and the process ends. If the devices are valid, the RDC 304 temporarily buffers 408 the received PDK information. It is noted that in one embodiment, steps 402-408 are automatically initiated each time a PDK 102 enters the proximity zone of the Reader 108. Thus, if multiple PDKs 102 enter the proximity zone, the Reader 108 automatically determines which PDKs 102 are valid and buffers the received information from each valid PDK 102.

The method next determines 410 whether profile authentication is required based on the configuration of the Reader 108, the type of transaction desired or by request of a merchant or other administrator. If the Reader 108 configuration does not require a profile authentication in addition to the PDK authentication, then the Reader 108 proceeds to complete the transaction for the PDK 102. If the Reader 108 does require profile authentication, the profile authentication is performed 412 as will be described below with references to FIGS. 6-7D. If a required profile is determined 414 to be valid, the Reader 108 completes 416 the transaction. Otherwise, the Reader 108 indicates that the transaction is not authorized 418. In one embodiment, completing 416 the transaction includes enabling access to secure physical or digital assets (e.g., unlocking a door, opening a vault, providing access to a secured hard drive, etc.). In another embodiment, completing 416 the transaction includes charging a credit card for a purchase. Alternatively, bank information, debit/check/ATM card information, coupon codes, or any other purchasing means information (typically stored in a profile memory field 232) can be transmitted by the PDK 102 in place of credit card information. In one embodiment, the PDK 102 is configured with multiple purchasing means and a default is configured for different types of transactions. In another embodiment, each credit card or other purchasing means is displayed to the customer by the Reader 108 and the customer is allowed to select which to use for the transaction.

Figure 6:
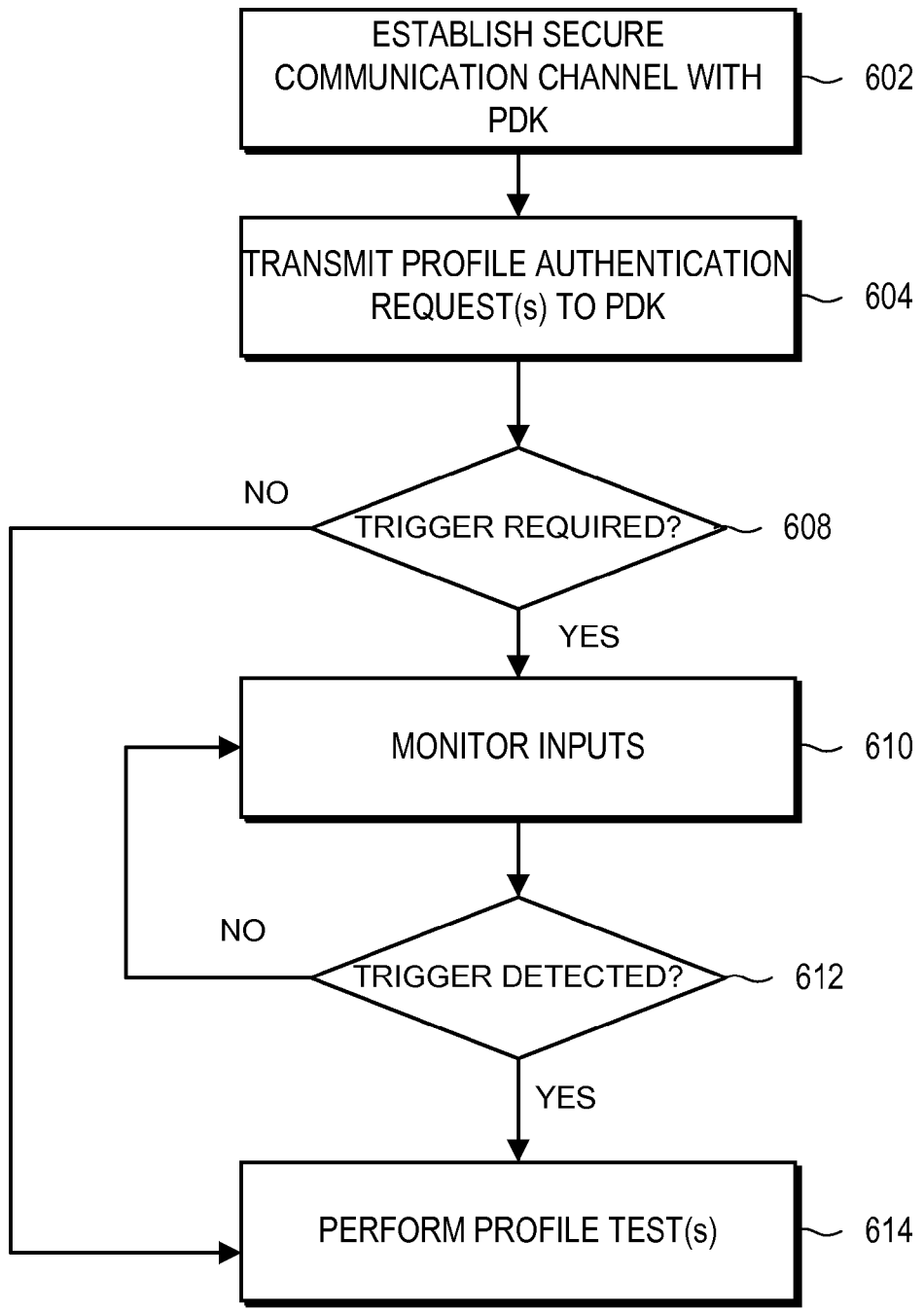
FIG. 6 is a flowchart illustrating one embodiment of a process for profile authentication by a Reader.

Turning now to FIG. 6, an embodiment of a process for profile authentication is illustrated. In step 602, a secure communication channel is established between the RDC 304 and the PDK 102. Information sent and received over the secure channel is in an encrypted format that cannot be practically decoded, retransmitted, reused, or replayed to achieve valid responses by an eavesdropping device. The Reader 108 transmits 604 profile authentication requests to the PDK 102 requesting transmission of one or more stored profiles over the secure channel. At 608, the process determines whether a "trigger" is required for authentication. The requirement for a trigger depends on the configuration of the Reader 108, the specific type of transaction to be executed and the type of authentication requested.

In a first configuration, a trigger is required to continue the process because of the type of authentication being used. For example, in biometric authentication, the authentication process cannot continue until the Reader detects a biometric contact and receives biometric information. It is noted that biometric contact is not limited to physical contact and can be, for example, the touch of a finger to a fingerprint scanner, the positioning of a face in front of a facial or retinal scanner, the receipt of a signature, the detection of a voice, the receipt of a DNA sample, RNA sample, or derivatives or any other action that permits the Reader 108 to begin acquiring the biometric input 104. By supplying the biometric contact, the user indicates that the authentication and transaction process should proceed. For example, a PDK holder that wants to make a withdrawal from an Automated Teller Machine (ATM) equipped with a Reader 108 initiates the withdrawal by touching a finger to the Reader 108. The ATM then begins the transaction process for the withdrawal.

In a second configuration, some other user action is required as a trigger to proceed with the transaction even if the authentication process itself doesn't necessarily require any input. This can be used for many purchasing transactions to ensure that the purchase is not executed until intent to purchase is clear. For example, a Reader 108 at a gas station can be configured to trigger the transaction when a customer begins dispensing gas. At a supermarket, a Reader 108 can be configured to trigger the transaction when items are scanned at a checkout counter.

In a third configuration, no trigger is used and the Reader 108 automatically completes the remaining authentication/transaction with no explicit action by the user. This configuration is appropriate in situations where the mere presence of a PDK 102 within range of the Reader 108 is by itself a clear indication of the PDK owner's desire to complete a transaction. For example, a Reader 108 can be positioned inside the entrance to a venue hosting an event (e.g., a sporting event, a concert, or a movie). When a PDK owner walks through the entrance, the Reader 108 detects the PDK 102 within range, authenticates the user, and executes a transaction to purchase an electronic ticket for the event. In another embodiment, the electronic ticket can be purchased in advance, and the Reader 108 can confirm that the user is a ticket holder upon entering the venue. Other examples scenarios where this configuration is useful include boarding a transportation vehicle (e.g., a train, bus, airplane or boat), entering a hotel room, or accessing secure facilities or other assets. Thus, if no trigger is required, the process next performs 614 the requested profile authentication tests.

If a trigger is required, the Reader monitors 610 its inputs (e.g., a biometric reader, key pad, etc.) and checks for the detection 612 of a trigger. If the required trigger is detected, the process continues to perform 614 one or more profile authentication test. FIGS. 7A-7D illustrate various embodiments of profile authentication tests. According to different configurations of the Reader 108, one or more of the illustrated authentication processes may be used. Further, in some embodiments, one or more of the processes may be repeated (e.g., for different types of biometric inputs).

Figure 7B:
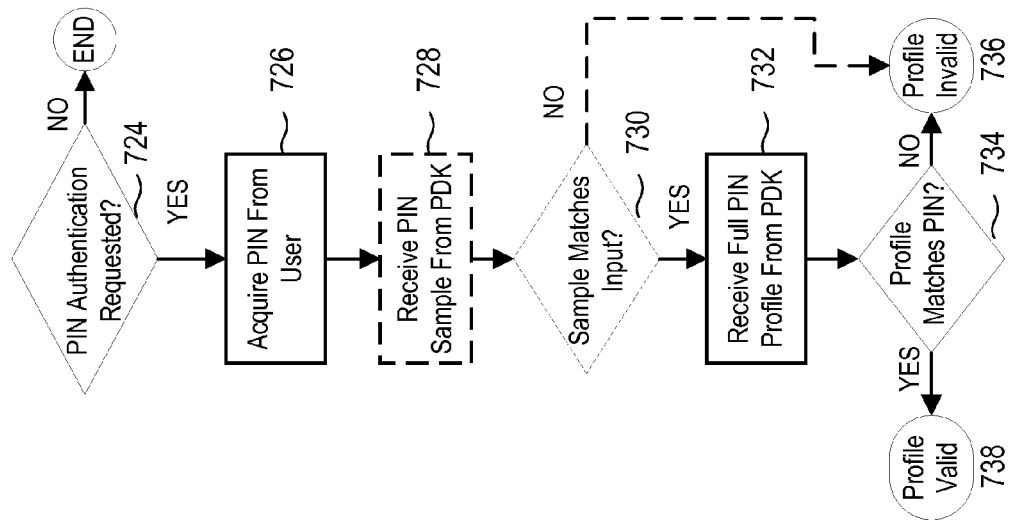
FIG. 7B is a flowchart illustrating one embodiment of a process for profile testing using a personal identification number.
Figure 7A:
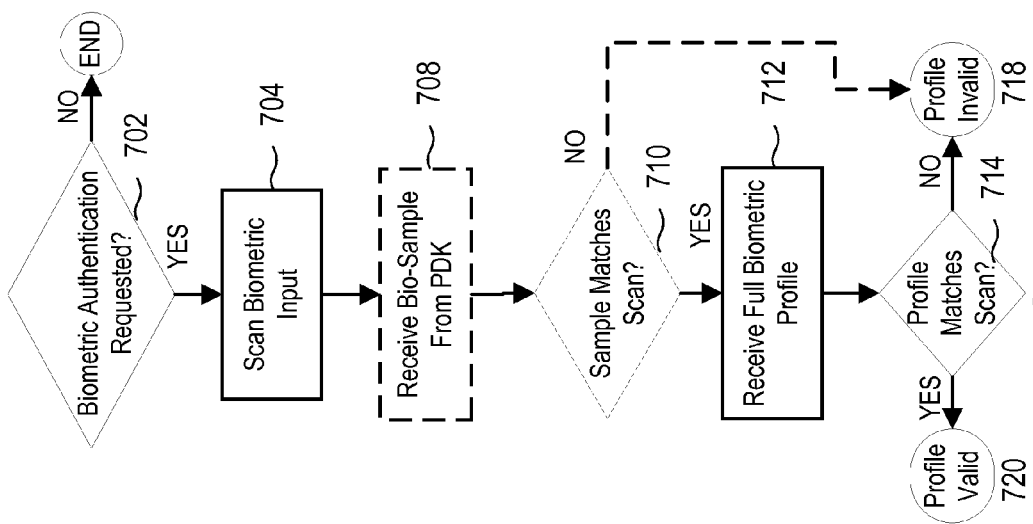
FIG. 7A is a flowchart illustrating one embodiment of a process for profile testing using a biometric input.

Referring first to FIG. 7A, it illustrates a process for biometric authentication. In biometric authentication, a Reader 108 compares a biometric profile stored in the PDK 102 to the biometric input 104 acquired by the biometric reader 302. Advantageously, the biometric input 104 is not persistently stored by the Reader 108, reducing the risk of theft or fraudulent use. If 702 biometric authentication is requested, the Reader 108 scans 704 the biometric input 104 supplied by the user. In one embodiment, scanning 704 includes computing a mathematical representation or hash of the biometric input 104 that can be directly compared to the biometric profile.

Furthermore, in one embodiment, scanning 704 also includes obtaining a biometric input sample from the biometric input according to the same function used to compute the biometric profile sample stored in the PDK 102. Optionally, the Reader 108 receives 708 a biometric profile sample from the PDK 102 and determines 710 if the biometric profile sample matches the biometric input sample. If the biometric profile sample does not match the input sample computed from the scan, the profile is determined to be invalid 718. If the biometric profile sample matches, the full biometric profile 712 is received from the PDK 102 to determine 714 if the full biometric profile 712 matches the complete biometric input 104. If the profile 712 matches the scan, the profile 712 is determined to be valid 720, otherwise the profile 712 is invalid 718. It is noted that in one embodiment, steps 708 and 710 are skipped and only a full comparison is performed. In one embodiment, the biometric profile and/or biometric profile sample is encoded and transmitted to the Reader 108 along with an encoding key and/or algorithm. Then, the Reader 108 uses the encoding key and/or algorithm to recover the biometric profile and/or biometric profile sample. In another alternative embodiment, only the encoding key and/or algorithm is transmitted by the PDK 102 and the biometric profile data is recovered from a remote database in an encoded form that can then be decoded using the key and/or algorithm.

It will be apparent to one of ordinary skill that in alternative embodiments, some of the steps in the biometric profile authentication process can be performed by the PDK 102 instead of the Reader 108 or by an external system coupled to the Reader 108. For example, in one embodiment, the biometric input 104 can be scanned 704 using a biometric reader built into the PDK 102. Furthermore, in one embodiment, the steps of computing the mathematical representation or hash of the biometric input and/or the steps of comparing the biometric input to the biometric profile can be performed by the PDK 102, by the Reader 108, by an external system coupled to the Reader 108, or by any combination of the devices. In one embodiment, at least some of the information is transmitted back and forth between the PDK 102 and the Reader 108 throughout the authentication process. For example, the biometric input 104 can be acquired by the PDK 102, and transmitted to the Reader 108, altered by the Reader 108, and sent back to the PDK 102 for comparison. Other variations of information exchange and processing are possible without departing from the scope of the invention. The transfer of data between the PDK 102 and the Reader 108 and/or sharing of processing can provide can further contribute to ensuring the legitimacy of each device.

FIG. 7B illustrates a process for PIN authentication. If PIN authentication is requested 724, a PIN is acquired 726 from the user through a keypad, mouse, touch screen or other input mechanism. Optionally, the Reader 108 receives 728 a PIN sample from the PDK 102 comprising a subset of data from the full PIN. For example, the PIN sample can comprise the first and last digits of the PIN. If the Reader 108 determines 730 that the PIN sample does not match the input, the profile is immediately determined to be invalid 736. If the PIN sample matches, the full PIN profile is received 732 from the PDK and compared to the input. If the Reader 108 determines 734 that the profile matches the input, the profile is determined to be valid and is otherwise invalid 736. It is noted that in one embodiment, steps 728 and 730 are skipped.

Figure 7D:
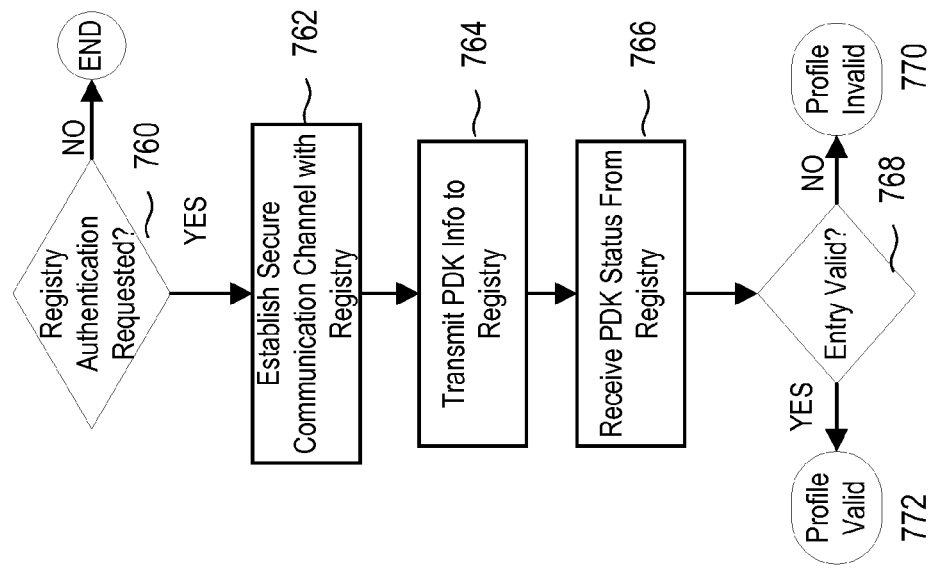
FIG. 7D is a flowchart illustrating one embodiment of a process for profile testing using a private or central registry.
Figure 7C:
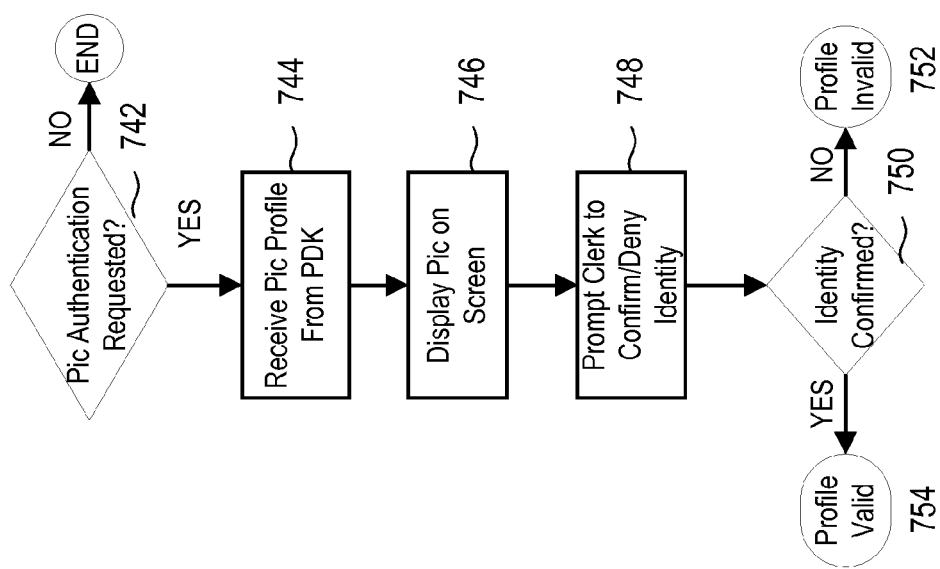
FIG. 7C is a flowchart illustrating one embodiment of a process for profile testing using a picture profile.

FIG. 7C illustrates a process for a picture authentication. If the Reader 108 determines 724 that picture authentication is requested, a picture profile is received 744 from the PDK 102 by the Reader 108 and displayed 746 on a screen. An administrator (e.g., a clerk, security guard, etc.) is prompted 748 to compare the displayed picture to the individual and confirms or denies if the identities match. If the administrator confirms that the identities match, the picture profile is determined to be valid 764 and is otherwise invalid 752. In an alternative embodiment, the process is automated and the administrator input is replaced with a process similar to that described above with reference to FIG. 7A. Here, an image of the user is captured and face recognition is performed by comparing picture profile information received from the PDK 102 to the captured image.

FIG. 7D illustrates a process for authentication with a private registry 114 or the Central Registry 116. If the Reader 108 determines that registry authentication is requested, a secure communication channel is established 762 over the network 110 between the Reader 108 and one or more registries (e.g., the Central Registry 114, any private registry 116, or other validation database 112). If any additional information is needed to process the registry authentication (e.g., a credit card number), the Reader 108 requests and receives the additional information from the PDK 102. Identification information is transmitted 764 from the Reader 108 to the registry 114-116 through the network interface 308. The PDK status is received 766 from the registry to determine 768 if the status is valid 772 or invalid 770. In one embodiment, the information is processed remotely at the registry 114-116 and the registry 114-116 returns a validation decision to the Reader 108. In another embodiment, the Reader 108 queries the private 116 or Central registry 114 for information that is returned to the Reader 108. The information is then analyzed by the Reader 108 and the authorization decision is made locally. In one embodiment, the process involves transmitting credit card (or other purchasing information) to a validation database 112 to authorize the purchase and receive the status of the card. Status information may include, for example, confirmation that the card is active and not reported lost or stolen and that sufficient funds are present to execute the purchase.

Figure 8:
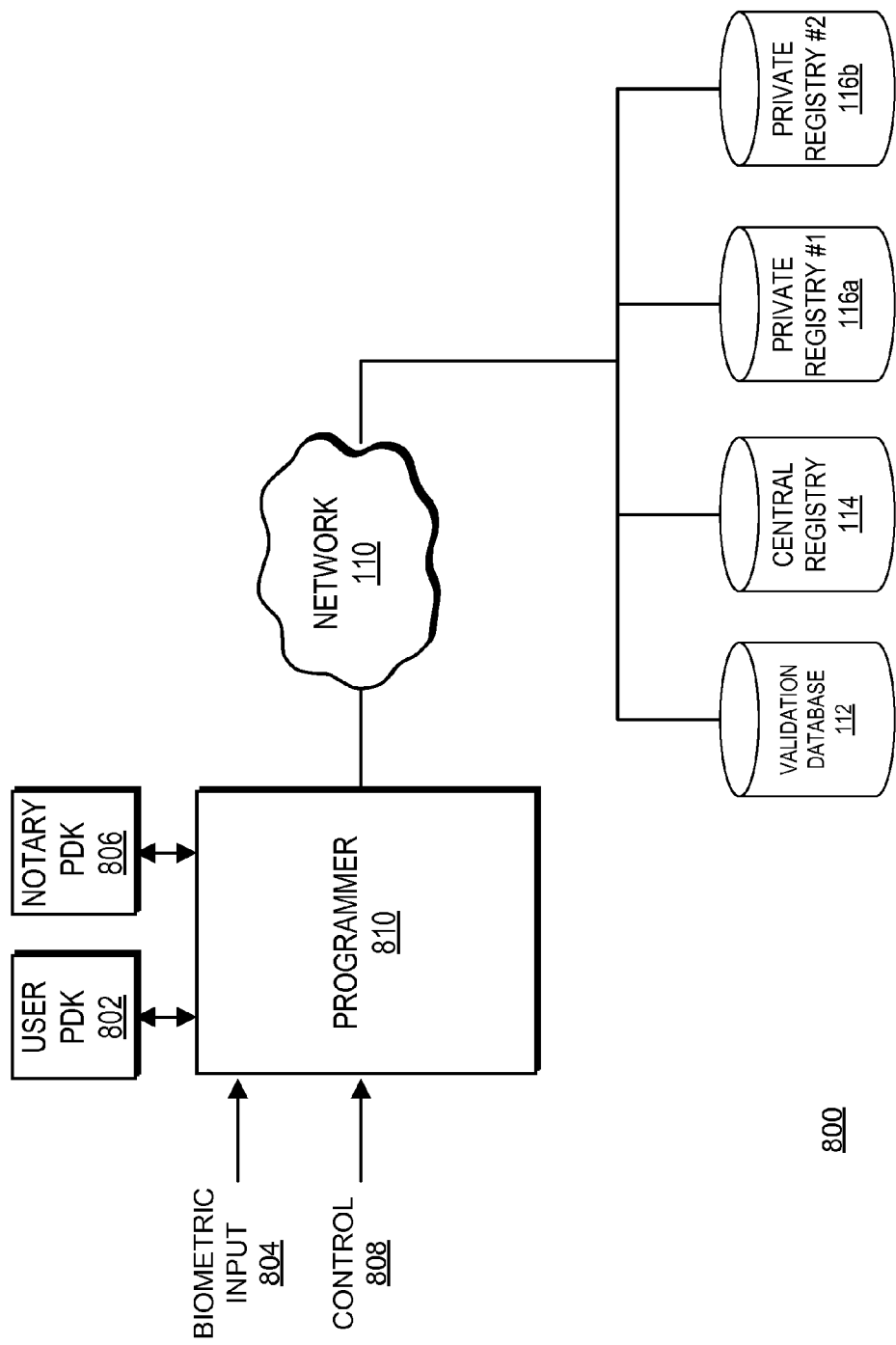
FIG. 8 is a high level block diagram illustrating a system for initializing and registering a PDK for use in secure electronic authentication.

Turning now to FIG. 8, a system 800 is illustrated for initializing and registering a PDK 802 through secure trusted initialization and registration processes. The system 800 comprises a Programmer 810, a user PDK 802, a Notary PDK 806, a network 110 and a set of external databases including a validation database 112, a Central Registry 114 and one or more private registries 116. The Programmer 810 couples to the user PDK 802, the Notary PDK 806, and a network 110 by either wired or wireless links. The Programmer 810 is also capable of receiving a biometric input 104 from a user and a control input 808 from either the user or the Notary. The network 110 is coupled to the validation database 112, the Central Registry 114 and two private registries 116. In alternative embodiments, different or additional external registries or databases may be coupled to the network. In another alternative embodiment, the Programmer can operate as a standalone device without any connection to the network 110.

Generally, the system 800 is adapted to initialize and/or register a user PDK 802 through a secure trusted process. Initialization includes configuring a user PDK 802 for at least its most basic use and can include acquiring one or more biometric profiles (or other profile) from the user according to a trusted process. The registration process registers a user PDK 802 with the Central Registry 114 and/or one or more private registries 116. Additionally, registration can include programming profile memory fields 232 in the user PDK 802 to store, for example, credit card information, personal information or other information used for authentication or transaction purposes.

As previously mentioned, in one embodiment, the initialization process is administered and witnessed by a trusted third-party referred to as a Notary. Conceptually, a Notary can be thought of as an enhanced public notary that can be trusted to verify that an individual's identification has been properly authenticated prior to the execution of a transaction. Instead of witnessing an individual sign a legally-binding document, the Notary witnesses the acquisition and storage of an authenticated individual's biometric profile. The Notary ensures that the individual's identification and biometric profile comply with, and have been acquired and processed according to defined security protocols. In one embodiment, various requirements may be imposed on the Notary to be eligible for administering initialization and the requirements may be definable for different types of initialization. For example, in one embodiment a Notary has to pass an extensive background check, receive training, or provide signatures agreeing to fulfill the duties of a trusted Notary. Furthermore, regular audits may be performed on Notaries to ensure that they can be trusted and are not associated with any fraudulent activity. It is noted that not all types of initialization and registration require a Notary.

The initialization and registration processes are enabled by using a Programmer 810 to write initialization and registration information to a user PDK 802. In one embodiment, the Programmer 810 also communicates with a Notary PDK 806 belonging to a Notary that verifies the processes and ensures that the initialization and registration information can be trusted. For registration, the Programmer 810 communicates to the Central Registry 114, one or more validation databases 112 or one or more private registries 116 through the network 110.

Figure 9:
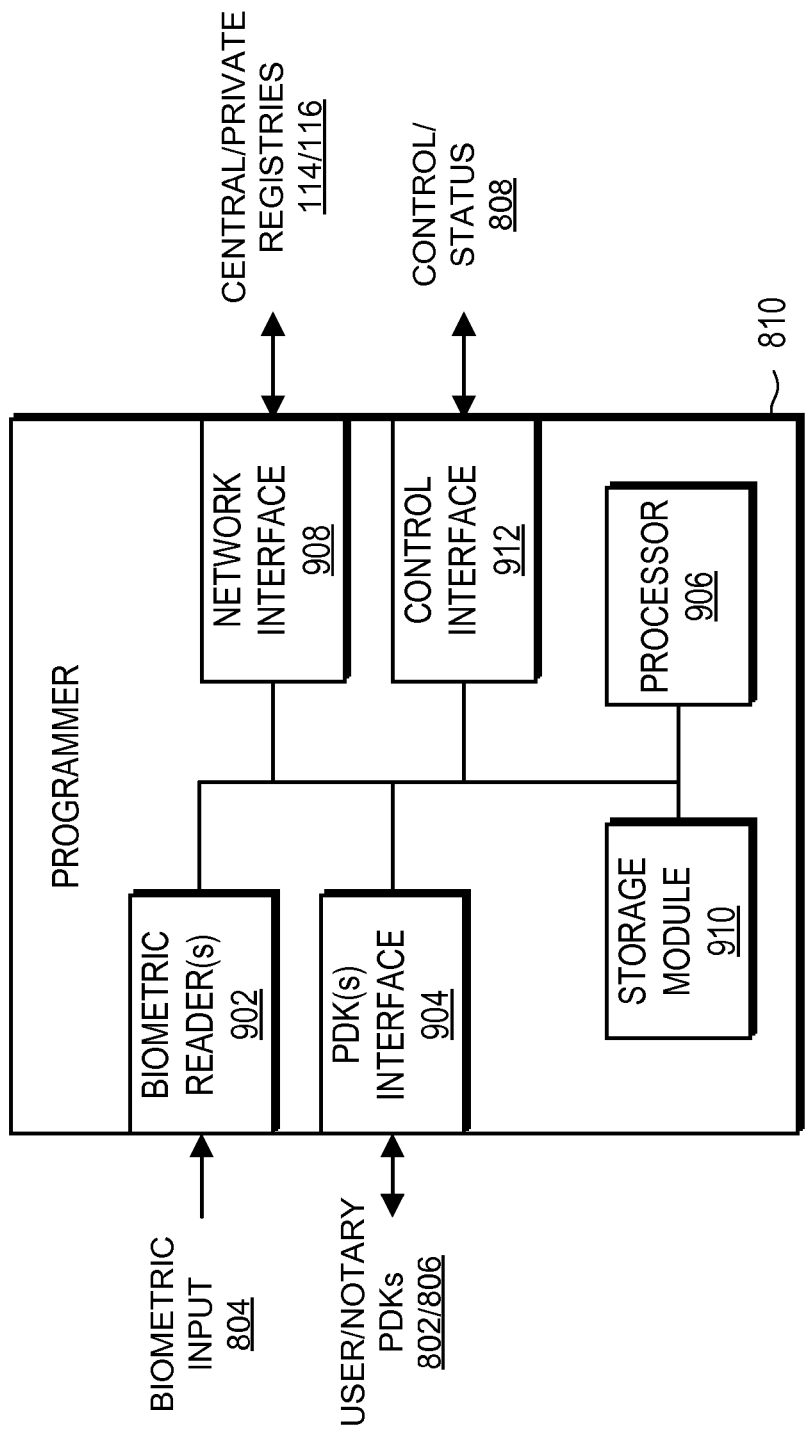
FIG. 9 is a block diagram illustrating one embodiment of a Programmer for programming a PDK.

FIG. 9 illustrates an example embodiment of a Programmer 810. The Programmer 810 includes one or more biometric readers 902, an interface 904 for one or more PDKs, a storage module 910, a processor 906, a control interface 912, and a network interface 908.

It is noted that some of the modules of the Programmer 810 operate similarly to modules of the Touch Reader 108 previously described. For example, the biometric reader 902, network interface 908 and processor 906 can be similar in architecture to the biometric reader 302, network interface 308 and processor 306 of the Touch Reader 108. However, the operation of these components is as described below with reference to FIGS. 10-14. The PDK interface 904 couples the Programmer 810 to the programmer I/O 240 of one or more PDKs. In one embodiment, the PDK interface 904 simultaneously couples to a Notary PDK 806 and a user PDK 802. In another embodiment, two or more Notary PDKs 806 can be coupled to the interface 904 in addition to the user PDK 802. In yet another embodiment, the interface 904 only couples to one PDK at a time but allows different PDKs to be swapped in and out. In an alternative configuration, the Notary PDK 806 can couple to the PDK interface 904 from a remote location. For example, a Notary PDK 806 can couple to the Programmer through a network, allowing the Notary to perform the initialization from a remote location. In another configuration, the Notary function is performed by trusted hardware or other automated means that can be built into the Programmer, rather than by a human.

The control interface 912 receives control inputs 808 from a user or from a Notary and outputs status indicators. Control inputs 808 can include, for example, programming settings, menu selections, confirmations and so on. Outputs can include, for example, status LEDs, an LCD with or without a touchscreen interface, or other display that provides instructions, menus or programming options to the user and/or Notary.

The storage module 910 temporarily stores user information during programming. In one embodiment, the storage module 910 includes volatile and non-volatile memory. Typically, biometric information or other highly personal information is erased from the storage module 910 upon completion of programming or removal of the Notary PDK 806 or user PDK 802. In one embodiment, the storage module 910 includes long-term storage for storing programming history information. Programming history can include, for example, the PDK ID, Notary ID, site ID, and timestamps associated with the programming of any PDK. The programming history can be recalled at a later time for auditing purposes.

Figure 10:
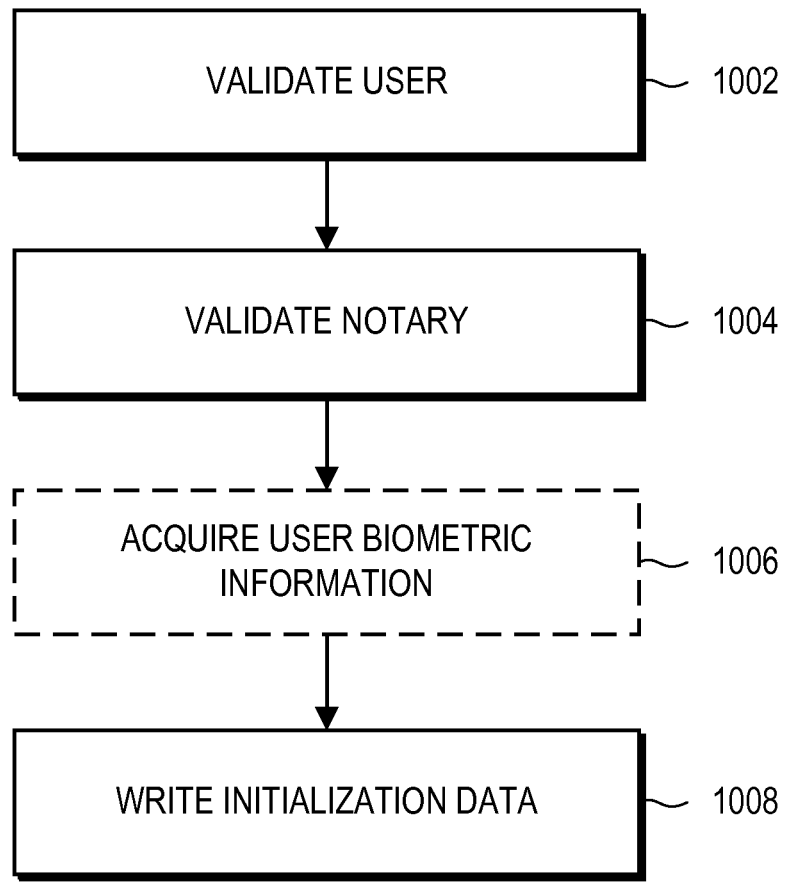
FIG. 10 is a flowchart illustrating one embodiment of a process for PDK initialization.

Turning now to FIG. 10, an embodiment of a high-level process for initializing a PDK is illustrated. To establish trust and credibility of data stored on the PDK, the Programmer validates 1002 a user and validates 1004 an Notary. The process for validation is described in more detail below with reference to FIG. 11. Validation ensures that both the user and Notary are who they claim to be, that the user is eligible for PDK initialization, and that the Notary is authorized to administer the registration process. In the case of a biometric initialization, the Programmer 810 acquires 1006 biometric information from the user for storage in a biometric profile of the user PDK 802. This process is described in more detail below with reference to FIG. 12. The Programmer 810 can further acquire multiple types of biometric profiles, or other types of user profiles. The initialization history is then written 1008 to the PDK 802 and optionally to the Programmer 810 for future auditing. This process is described in more detail below with reference to FIG. 12.

Figure 11:
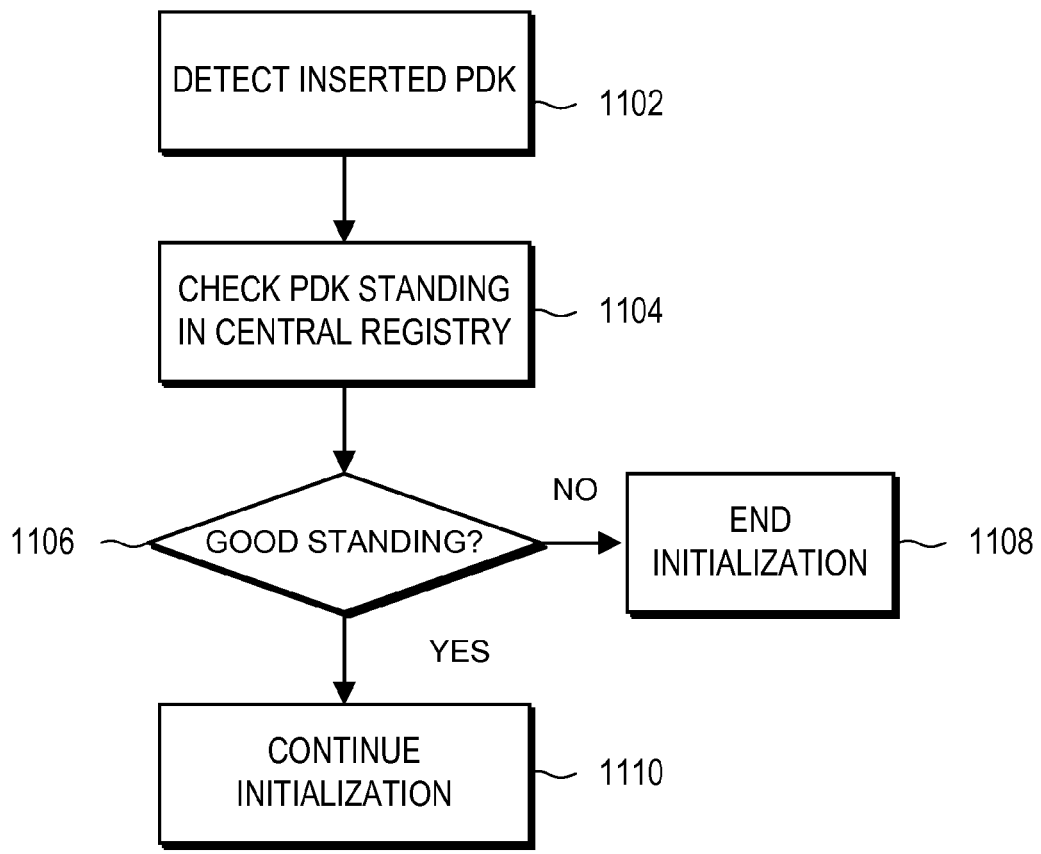
FIG. 11 is a flowchart illustrating one embodiment of a process for validating a PDK for initialization.

The steps of FIG. 10 are described in more detail with reference to FIGS. 11-13. FIG. 11 corresponds to a process for validating 1002 a user PDK 802 and the process for validating 1004 a Notary PDK 806. The user PDK 802 and Notary PDK 806 validation can occur in either order, or can be processed in parallel. To begin validation, the Programmer 810 detects 1102 a PDK 802/806 at the PDK interface 904. The Programmer 810 next checks 1104 standing or status of the PDK 802/806 with the Central Registry 114. In the case of a user PDK 802, the Programmer 810 confirms with the Central Registry 114 that the PDK 802 has not, for example, expired, been reported as lost or stolen, had fraudulent activity associated with the PDK 802, or had any complaints been filed against the user for lack of payments, etc. Further, the Programmer 810 can confirm that the software internal to the user PDK 802 is valid and has not been tampered with. In many cases, the user PDK 802 has never been previously initialized or registered and automatically qualifies for good standing. The step of checking 1104 the PDK standings vary slightly for an Notary PDK 806. Here, the check 1104 ensures that the Notary is a registered Notary, that no fraudulent activity has been associated with the Notary or any PDK initialized or registered by the Notary, that the software internal to the Notary PDK 806 is valid and has not been tampered with, and that the Notary can be trusted to administer the initialization. The process determines 1106 if the PDK (user 802 or Notary 806) is in good standing. If the PDK (user 802 or Notary 806) is determined to be in good standing, the initialization is allowed to continue 1110. If the PDK (user 802 or Notary 806) is not in good standing the initialization process ends 1108.

In one embodiment, validation further includes the PDK 802/806 validating that the Programmer 810 is a valid trusted device. This validation ensures that the Programmer 810 has not been tampered with for fraudulent use. Various device authentication processes are possible such as, for example, a challenge-response authentication. Further, the Programmer 810 can be validated by a remote registry to ensure its software is update, the device has not been tampered with or the hardware has not been reported as lost, stolen, expired or revoked. If any fraudulent activity is detected with the Programmer, the Programmer can be automatically disabled.

Figure 12:
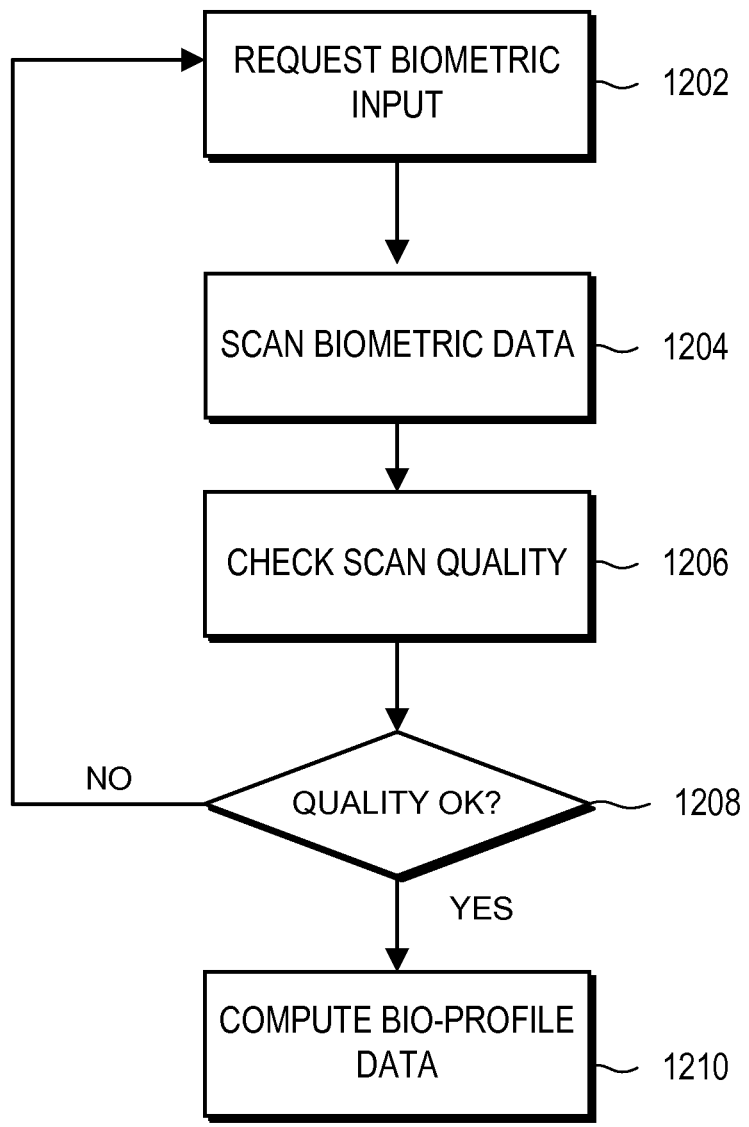
FIG. 12 is a flowchart illustrating one embodiment of a process for acquiring biometric information for PDK initialization.

Initialization optionally includes acquiring 1006 biometric information to be stored in the biometric profile of the user PDK 802 as illustrating in FIG. 12. To begin the process, the Programmer 802 requests 1202 biometric input 804 from the user. The biometric input 804 is then scanned 1204 by the biometric reader 902. For example, in a fingerprint-based initialization, scanning 1204 includes requesting the user to place each desired finger on the biometric reader 902 of the Programmer 810 and capturing an image representing the unique characteristics of the fingerprint. In other types of biometric initialization, scanning 1204 can include capturing a different type of image (e.g., a palm, face, retina, iris, or signature), capturing audio for a voice-based biometric profile, or capturing DNA, RNA or their derivatives as used to establish identity. The Programmer 810 checks 1206 the quality of each scan to ensure that the captured biometric input 804 is valid. If 1208 the quality is not satisfactory (due to, for example, improper positioning during the scan), the Programmer 810 repeats the request 1202 for biometric input 804. If 1208 the quality of the scan meets the necessary standards, the biometric profile is computed from the scan results. As previously described, the biometric profile is generally computed by performing mathematical hashes on the acquired data. In addition, in one embodiment, the biometric profile can be encoded according to an encoding key and/or algorithm that is stored with the biometric profile data. This process can be repeated for any number of biometric profile types.

Additional types of profiles can also be similarly stored to the user PDK 802. For example, a PIN profile can be added by prompting the user to enter a PIN or password. A photo profile can be added by capturing an image of the user, checking the quality of the image and recapturing the image if necessary.

Figure 13:
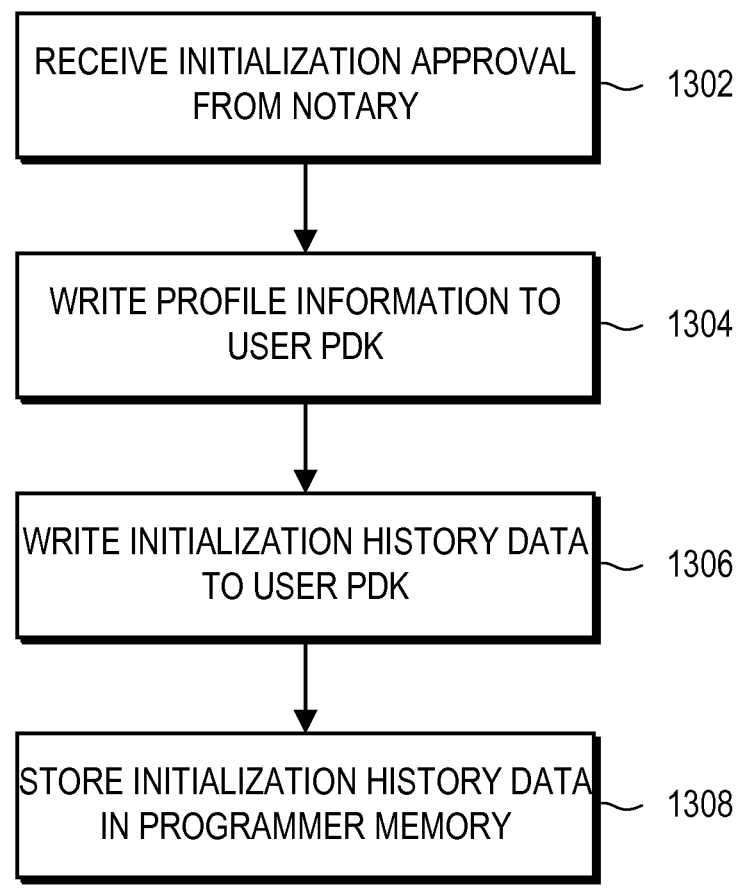
FIG. 13 is a flowchart illustrating one embodiment of a process for writing initialization data.

FIG. 13 illustrates an embodiment of a process for writing 1008 initialization data. In step 1302, the Programmer 810 receives initialization approval from the Notary. By submitting the approval, the Notary indicates that he/she has witnessed the initialization process and that the user's identity has been authenticated. In one embodiment, the approval can be executed automatically if all previous steps are validated. The acquired profile information and/or registry information is then written 1304 to the user PDK 802. Here, user data can include the profile to be written to the once-programmable memory or other information to be written to the read/write memory fields. History data is also written 1306 to the user PDK. History data includes information documenting the initialization process such as the Notary ID, the Programmer's ID, and the site ID (indicating the location of the initialization), registration date and time, and so on. Initialization history data can also be stored 1308 in the storage module 910 of the Programmer 810. This provides an audit trail of all programming operations performed by the Programmer 810. It should be noted that the user's biometric information is typically erased from the Programmer 810 and is therefore not at risk of theft or fraudulent use.

In one embodiment, initialization history information is also written to the Notary PDK 806. Here, a Notary PDK 806 can store a record of every initialization performed by the Notary. This information can be used for auditing purposes in the future. For example, if a Notary's rights are revoked, any initializations performed by that Notary can be recovered from the Notary's PDK 806. Then, user PDKs 802 initialized by that Notary may need to be disabled until re-initialized by the user.

Figure 14:
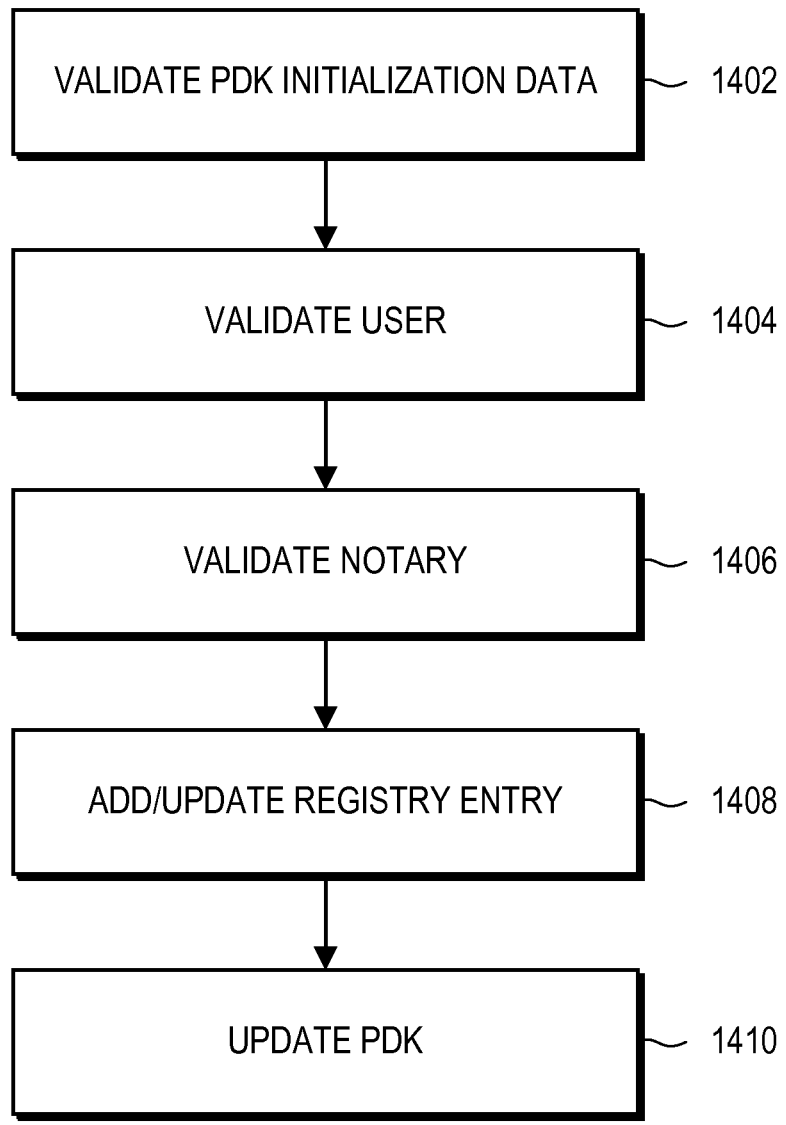
FIG. 14 is a flowchart illustrating one embodiment of a process for registering a PDK with a registry.

FIG. 14 illustrates a method for registering a PDK with a Central 114 or private 116 registry. In step 1402, the PDK initialization data is validated by the Programmer 810 to confirm that the PDK 802 has been properly initialized as described in FIGS. 10-13. The user is validated 1404 and the Notary administering the registration is validated 1406. In one embodiment, the validation steps can be executed by steps similar to the process of FIG. 11 used in initialization. If the user and Notary are both validated, the registry entry is added 1408 to the registry if the user is new to the registry, or a registry entry is updated 1408 if the user has already previously been registered. In this step, user information is transmitted by the network interface 908 of the Programmer 810 to the private 116 or Central Registry 114. A registry entry can include for example, the unique user PDK, purchasing information (such as credit/debit/ATM card information or bank account information), and personal information (such as name, address, phone number, date of birth, etc.). The user PDK 802 is then updated 1410 by storing the information to the memory of the PDK. Information associated with a registry update (user PDK ID, Notary ID, programmer ID, site ID, registry ID, timestamps, etc.) can also be written to the storage module 910 of the Programmer 810 to enable future audits. In an alternative embodiment, the Programmer 810 can operate as a portable standalone device that can register a user PDK 802 in an offline mode. Then, the Programmer can be later coupled to a network to upload any new registrations to a private registry 116, Central Registry 114, or validation database 112.

It is noted that although in many embodiments of the present invention, the Notary performs the initialization and registration process in person, it is also possible for the Notary to operate from a remote location. For example, in one embodiment, a user can enter an initialization booth with a camera and a Programmer 810. The user enters the user PDK 802 into the Programmer 810 and begins the initialization session. A Notary at a remote location can monitor the operation and if necessary provide instructions to the user. Alternatively, the initialization and registration can be administered by a completely automated process that can be recalled and reviewed at a later time to ensure the user followed the appropriate procedures. In another embodiment, a human Notary is not required, and the initialization and/or registration processes are performed entirely by trusted hardware.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method of initializing a personal digital key (PDK) for secure authentication, the method comprising:
   reading, with a programming device, user information from a first PDK to determine whether a user is authorized for initialization;
   determining, with the programming device, a status of the first PDK based at least in part on a registry including data describing the status of the first PDK;
   responsive to determining that the status of the first PDK is in good standing, determining, with the programming device, that the user is authorized for initialization;
   reading, with the programming device, notary information from a notary PDK to determine whether a notary is authorized to witness the initialization;
   acquiring a biometric input from the user, wherein the acquisition is witnessed by the notary; and
   responsive to the user and the notary being authorized, storing a biometric profile on the first PDK.

2. The method of claim 1, comprising:
   determining a status of the first PDK based at least in part on a registry including data describing the status of the first PDK, and
   wherein one or more of determining that the first PDK is authorized, acquiring the biometric information from the user and storing the biometric profile on the first PDK is responsive to the status of the first PDK being in good standing.

3. The method of claim 2, wherein the first PDK is in good standing if the first PDK has not been reported as lost, stolen, expired or revoked.

4. The method of claim 2, wherein the first PDK is in good standing if the first PDK has not been initialized.

5. The method of claim 1, wherein acquiring the biometric input comprises:
   scanning the biometric input; and
   performing a transformation on the biometric input to generate the biometric profile.

6. The method of claim 5, comprising:
   checking a quality of the scanned biometric input; and
   responsive to the quality not being satisfactory, re-scanning the biometric input.

7. The method of claim 1, comprising storing initialization history data including at least one of an identifier of the first PDK, an identifier of the notary PDK, a programming device ID and a site ID.

8. The method of claim 1, comprising writing initialization history data to the first PDK, wherein initialization history data comprises at least one of a an identifier of the first PDK, an identifier of the notary PDK, a programming device ID and a site ID.

9. The method of claim 1, comprising:
   receiving a hardware authentication request from the first PDK;
   transmitting programming device information to the first PDK; and
   responsive to the first PDK determining that the programming device is a valid device, receiving authorization from the first PDK to continue initialization.

10. The method of claim 1, comprising determining that the notary PDK is authorized to administer initialization including:
    checking a status of the notary PDK in a registry; and
    wherein one or more of determining that the notary PDK is authorized, acquiring the biometric information from the user and storing the biometric profile on the first PDK is responsive to the status of the first PDK being in good standing.

11. The method of claim 1, further comprising determining if the programming device is in good standing.

12. The method of claim 11, wherein the programming device is in good standing if the programming device has not been reported as lost, stolen, expired or revoked and the programming device does not comprise altered software.

13. The method of claim 1, wherein the notary associated with the notary PDK administers the initialization process from a remote location.

14. The method of claim 1, further comprising transmitting registry information to a remote registry to add or update a registry entry, wherein the registry information comprises at least one of a user PDK ID, purchasing information and personal information.

15. An apparatus for programming a personal digital key (PDK) for use in secure authentication, comprising:
a PDK interface adapted to receive user information from the PDK for determining whether a user is authorized for initialization and to receive notary information from a notary PDK for determining whether a notary is authorized to witness initialization; a biometric reader adapted to acquire a biometric input from the user; and
a processor coupled to the PDK interface and the biometric reader to determine that the user is authorized for an initialization based at least in part on the user information, to determine that the user is authorized for an initialization based at least in part on the user information and responsive to determining that a status of the PDK is in good standing, to determine that the notary is authorized to witness an initialization based on the notary information and to instruct the PDK interface to write a biometric profile based on the biometric input to the PDK responsive to authorization of the user and of the notary PDK.

16. The apparatus of claim 15 comprising:
a network interface coupled to the processor, the network interface adapted to transmit notary PDK information to a remote registry and receive data describing the status of the notary PDK from the remote registry; and
wherein one or more of determining that the notary PDK is authorized, acquiring the biometric information from the user and storing the biometric profile on the user's PDK is responsive to the status of the user's PDK being in good standing.

17. The apparatus of claim 15 comprising:
a network interface coupled to the processor, the network interface adapted to transmit PDK information to the remote registry and receive the data describing the status of the PDK from the remote registry; and
wherein one or more of determining that the user is authorized, acquiring the biometric information from the user and storing the biometric profile on the PDK is responsive to the status of the PDK being in good standing.

18. The apparatus of claim 15, wherein the biometric profile including based on the biometric input is written to the user PDK responsive to determining that the programming device is in good standing.

19. The system of claim 15, wherein the biometric reader is adapted to obtain a representation of physical or behavioral characteristics derived from an individual.

20. The system of claim 15, wherein the biometric reader comprises at least one of a fingerprint scanner, a retinal scanner, an iris scanner, a face scanner, a palm scanner, a DNA analyzer, a signature analyzer and a voice analyzer.

\* \* \* \* \*